United States Patent
Yum et al.

(10) Patent No.: US 10,587,377 B2
(45) Date of Patent: Mar. 10, 2020

(54) METHOD FOR CHANNEL STATE REPORT USING APERIODIC CHANNEL STATE INFORMATION-REFERENCE SIGNAL AND APPARATUS THEREFOR

(71) Applicant: LG ELECTRONICS INC., Seoul (KR)

(72) Inventors: Kunil Yum, Seoul (KR); Jonghyun Park, Seoul (KR); Kijun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/579,579

(22) PCT Filed: Jun. 17, 2016

(86) PCT No.: PCT/KR2016/006432
§ 371 (c)(1),
(2) Date: Dec. 4, 2017

(87) PCT Pub. No.: WO2016/204546
PCT Pub. Date: Dec. 22, 2016

(65) Prior Publication Data
US 2018/0175983 A1 Jun. 21, 2018

Related U.S. Application Data

(60) Provisional application No. 62/180,624, filed on Jun. 17, 2015, provisional application No. 62/316,553, (Continued)

(51) Int. Cl.
*H04L 5/00* (2006.01)
*H04L 5/14* (2006.01)
(Continued)

(52) U.S. Cl.
CPC ............. *H04L 5/0048* (2013.01); *H04L 1/00* (2013.01); *H04L 5/0053* (2013.01);
(Continued)

(58) Field of Classification Search
CPC ....... H04L 5/0048; H04L 5/00; H04L 5/0053; H04L 5/14; H04L 1/00; H04W 72/04; H04W 72/0406
(Continued)

(56) References Cited

U.S. PATENT DOCUMENTS

2013/0028182 A1* 1/2013 Geirhofer ............ H04B 7/0626
370/328
2014/0056156 A1 2/2014 Jongren
(Continued)

FOREIGN PATENT DOCUMENTS

WO 2014107904 7/2014

OTHER PUBLICATIONS

PCT International Application No. PCT/KR2016/006432, Written Opinion of the International Searching Authority dated Aug. 31, 2016, 18 pages.
(Continued)

*Primary Examiner* — Chi Tang P Cheng
(74) *Attorney, Agent, or Firm* — Lee Hong Degerman Kang Waimey

(57) ABSTRACT

Provided is a method for channel state report using an aperiodic channel state information-reference signal (CSI-RS) in a wireless communication system according to an embodiment of the present invention, the method performed by a terminal and comprising the steps of: receiving a plurality of aperiodic CSI-RS resource settings contained in a single CSI process; receiving an indicator which indicates an aperiodic CSI-RS according to one of a plurality of aperiodic CSI-RS resource settings; and calculating channel
(Continued)

state information on the basis of the aperiodic CSI-RS indicated by the indicator when receiving a CSI request using an effective aperiodic CSI-RS and reporting the same to a base station, wherein the plurality of aperiodic CSI-RS resource settings may comprise parameters which are commonly applied to a plurality of CSI-RS resource settings in the single CSI process.

8 Claims, 10 Drawing Sheets

Related U.S. Application Data filed on Mar. 31, 2016, provisional application No. 62/326,825, filed on Apr. 24, 2016.

(51) Int. Cl.
*H04L 1/00* (2006.01)
*H04W 72/04* (2009.01)

(52) U.S. Cl.
CPC .............. *H04L 5/0057* (2013.01); *H04L 5/14* (2013.01); *H04W 72/0406* (2013.01)

(58) Field of Classification Search
USPC ........................................................ 370/329
See application file for complete search history.

(56) References Cited

U.S. PATENT DOCUMENTS

2014/0078919 A1 3/2014 Hammarwall
2017/0331609 A1* 11/2017 Xia ...................... H04L 5/0051

OTHER PUBLICATIONS

LG Electronics, "Discussion on specification impacts for beamformed CSI-RS-based schemes", 3GPP TSG RAN WG1 Meeting #81, R1-152750, May 2015, 3 pages.
ZTE, "Discussion on CSI-RS and CSI enhancement for EBF/FD-MIMO", 3GPP TSG RAN WG1 Meeting #81, R1-152985, May 2015, 8 pages.
Huawei et al., "Potential enhancements on non-precoded CSI-RS and CSI measurement", 3GPP TSG RAN WG1 Meeting #81, R1-152483, May 2015, 4 pages.
European Patent Office Application Serial No. 16811959.2, Search Report dated Jan. 16, 2019, 7 pages.
LG Electronics, et al., "WF on CSI-RS enhancements", 3GPP TSG RAN WG1 Meeting #81, R1-153596, May 2015, 6 pages.
LG Electronics, "Enhancements on beamformed CSI-RS including aperiodic CSI-RS", 3GPP TSG RAN WG1 Meeting #84bis, R1-162488, Apr. 2016, 4 pages.
Huawei, et al., "Discussion on efficient utilization of BFC CSI-RS", 3GPP TSG RAN WG1 Meeting #85, R1-164858, May 2016, 4 pages.
ETRI, "CSI-RS enhancements to support more than 8 CSI-RS ports", 3GPP TSG RAN WG1 Meeting #81, R1-153007, May 2015, 5 pages.

* cited by examiner

METHOD FOR CHANNEL STATE REPORT USING APERIODIC CHANNEL STATE INFORMATION-REFERENCE SIGNAL AND APPARATUS THEREFOR

CROSS-REFERENCE TO RELATED APPLICATIONS

This application is the National Stage filing under 35 U.S.C. 371 of International Application No. PCT/KR2016/006432, filed on Jun. 17, 2016, which claims the benefit of U.S. Provisional Application No. 62/180,624, filed on Jun. 17, 2015, 62/316,553, filed on Mar. 31, 2016, and 62/326,825, filed on Apr. 24, 2016, the contents of which are all hereby incorporated by reference herein in their entirety.

TECHNICAL FIELD

The present invention relates to a wireless communication system, and more particularly, to a method for channel state reporting using an aperiodic channel state information-reference signal and an apparatus therefor.

BACKGROUND ART

Recently, various devices requiring machine-to-machine (M2M) communication and high data transfer rate, such as smartphones or tablet personal computers (PCs), have appeared and come into widespread use. This has rapidly increased the quantity of data which needs to be processed in a cellular network. In order to satisfy such rapidly increasing data throughput, recently, carrier aggregation (CA) technology which efficiently uses more frequency bands, cognitive ratio technology, multiple antenna (MIMO) technology for increasing data capacity in a restricted frequency, multiple-base-station cooperative technology, etc. have been highlighted. In addition, communication environments have evolved such that the density of accessible nodes is increased in the vicinity of a user equipment (UE). Here, the node includes one or more antennas and refers to a fixed point capable of transmitting/receiving radio frequency (RF) signals to/from the user equipment (UE). A communication system including high-density nodes may provide a communication service of higher performance to the UE by cooperation between nodes.

A multi-node coordinated communication scheme in which a plurality of nodes communicates with a user equipment (UE) using the same time-frequency resources has much higher data throughput than legacy communication scheme in which each node operates as an independent base station (BS) to communicate with the UE without cooperation.

A multi-node system performs coordinated communication using a plurality of nodes, each of which operates as a base station or an access point, an antenna, an antenna group, a remote radio head (RRH), and a remote radio unit (RRU). Unlike the conventional centralized antenna system in which antennas are concentrated at a base station (BS), nodes are spaced apart from each other by a predetermined distance or more in the multi-node system. The nodes can be managed by one or more base stations or base station controllers which control operations of the nodes or schedule data transmitted/received through the nodes. Each node is connected to a base station or a base station controller which manages the node through a cable or a dedicated line.

The multi-node system can be considered as a kind of Multiple Input Multiple Output (MIMO) system since dispersed nodes can communicate with a single UE or multiple UEs by simultaneously transmitting/receiving different data streams. However, since the multi-node system transmits signals using the dispersed nodes, a transmission area covered by each antenna is reduced compared to antennas included in the conventional centralized antenna system. Accordingly, transmit power required for each antenna to transmit a signal in the multi-node system can be reduced compared to the conventional centralized antenna system using MIMO. In addition, a transmission distance between an antenna and a UE is reduced to decrease in pathloss and enable rapid data transmission in the multi-node system. This can improve transmission capacity and power efficiency of a cellular system and meet communication performance having relatively uniform quality regardless of UE locations in a cell. Further, the multi-node system reduces signal loss generated during transmission since base station(s) or base station controller(s) connected to a plurality of nodes transmit/receive data in cooperation with each other. When nodes spaced apart by over a predetermined distance perform coordinated communication with a UE, correlation and interference between antennas are reduced. Therefore, a high signal to interference-plus-noise ratio (SINR) can be obtained according to the multi-node coordinated communication scheme.

Owing to the above-mentioned advantages of the multi-node system, the multi-node system is used with or replaces the conventional centralized antenna system to become a new foundation of cellular communication in order to reduce base station cost and backhaul network maintenance cost while extending service coverage and improving channel capacity and SINR in next-generation mobile communication systems.

DISCLOSURE

Technical Problem

An object of the present invention devised to solve the problem lies in a method for channel state reporting based on an aperiodic channel state information-reference signal.

The technical objects that can be achieved through the embodiments are not limited to what has been particularly described hereinabove and other technical objects not described herein will be more clearly understood by those skilled in the art from the following detailed description.

Technical Solution

In an aspect of the present invention, provided herein is a method for channel state reporting using an aperiodic channel state information-reference signal (CSI-RS) in a wireless communication system, the method being performed by a terminal and including receiving a plurality of aperiodic CSI-RS resource configurations included in a single CSI process, receiving an indicator indicating an aperiodic CSI-RS according to one of the plurality of aperiodic CSI-RS resource configurations, and calculating channel state information based on the aperiodic CSI-RS indicated by the indicator upon receiving a CSI request using a valid aperiodic CSI-RS and reporting the calculated channel state information to a base station, wherein the plurality of aperiodic CSI-RS resource configurations may include parameters commonly applied to the plurality of CSI-RS resource configurations in the single CSI process.

Additionally or alternatively, the indicator may additionally indicate antenna port information common to the plurality of aperiodic CSI-RS resource configurations.

The method according to claim 1, wherein the indicator additionally indicates antenna port information for the aperiodic CSI-RS indicated by the indicator.

Additionally or alternatively, the method may further include calculating the channel state information based on the aperiodic CSI-RS on a resource element corresponding to the antenna port information for the aperiodic CSI-RS.

Additionally or alternatively, the method may include receiving control information indicating transmission of aperiodic CSI-RSs transmitted on a part of antenna ports in a plurality of adjacent subframes, wherein the control information may include information on the part of the antenna ports used for transmission of the aperiodic CSI-RSs in each of the subframes.

Additionally or alternatively, the method may include measuring aperiodic CSI-RSs according to the information on each of the part of the antenna ports in the plurality of adjacent subframes, and combining results of the measurement in the plurality of adjacent subframes and calculating channel information for an entirety of the antenna ports.

Additionally or alternatively, the indicator may indicate one of the plurality of aperiodic CSI-RS resource configurations in combination with the channel state report request using the aperiodic CSI-RS.

Additionally or alternatively, when the received channel state report request is received within K subframes from a time when the indicator is received, it may be determined that the received channel state report request is valid.

Additionally or alternatively, the method may include calculating channel state information for a CSI-RS configured as a target of aperiodic CSI in the single CSI process and reporting the calculated channel state information to the base station when the CSI request using the valid aperiodic CSI-RS is not received.

In another aspect of the present invention, provided herein is a terminal configured to perform channel state reporting using an aperiodic channel state information-reference signal (CSI-RS) in a wireless communication system, the terminal including a transmitter, a receiver, and a processor configured to control a transmitter and a receiver, wherein the processor is further configured to receive a plurality of aperiodic CSI-RS resource configurations included in a single CSI process, receive an indicator indicating an aperiodic CSI-RS according to one of the plurality of aperiodic CSI-RS resource configurations, and calculate channel state information based on the aperiodic CSI-RS indicated by the indicator upon receiving a CSI request using a valid aperiodic CSI-RS and report the calculated channel state information to a base station, wherein the plurality of aperiodic CSI-RS resource configurations may include parameters commonly applied to the plurality of CSI-RS resource configurations in the single CSI process.

Additionally or alternatively, the indicator may additionally indicate antenna port information common to the plurality of aperiodic CSI-RS resource configurations.

Additionally or alternatively, the indicator may additionally indicate antenna port information for the aperiodic CSI-RS indicated by the indicator.

Additionally or alternatively, the processor may be configured to calculate the channel state information based on the aperiodic CSI-RS on a resource element corresponding to the antenna port information for the aperiodic CSI-RS.

Additionally or alternatively, the processor is configured to receive control information indicating transmission of aperiodic CSI-RSs transmitted on a part of antenna ports in a plurality of adjacent subframes, wherein the control information may include information on the part of the antenna ports used for transmission of the aperiodic CSI-RSs in each of the subframes.

Additionally or alternatively, the processor may be configured to measure aperiodic CSI-RSs according to the information on each of the part of the antenna ports in the plurality of adjacent subframes, and combine results of the measurement in the plurality of adjacent subframes and calculating channel information for an entirety of the antenna ports.

Additionally or alternatively, the indicator may indicate one of the plurality of aperiodic CSI-RS resource configurations in combination with the channel state report request using the aperiodic CSI-RS.

Additionally or alternatively, when the received channel state report request is received in K subframes from the time the received indicator is received, the received channel state report request is determined to be valid.

Additionally or alternatively, the processor may be configured to calculate channel state information for a CSI-RS configured as a target of aperiodic CSI in the single CSI process and report the calculated channel state information to the base station when the channel state report request using the valid aperiodic CSI-RS is not received.

The above-described aspects of the present invention are merely a part of embodiments of the present invention. Those skilled in the art will derive and understand various embodiments reflecting the technical features of the present invention from the following detailed description of the present disclosure.

Advantageous Effects

According to embodiments of the present invention, a channel state report according to a periodic channel state report-reference signal may be efficiently processed according to the number of extended antenna ports.

It will be appreciated by those skilled in the art that that the effects that can be achieved through the embodiments of the present invention are not limited to those described above and other effects of the present invention will be more clearly understood from the following detailed description.

DESCRIPTION OF DRAWINGS

The accompanying drawings, which are included to provide a further understanding of the invention and are incorporated in and constitute a part of the detailed description, illustrate embodiments of the disclosure and together with the description serve to explain the principle of the disclosure.

BEST MODE

Figure 1:
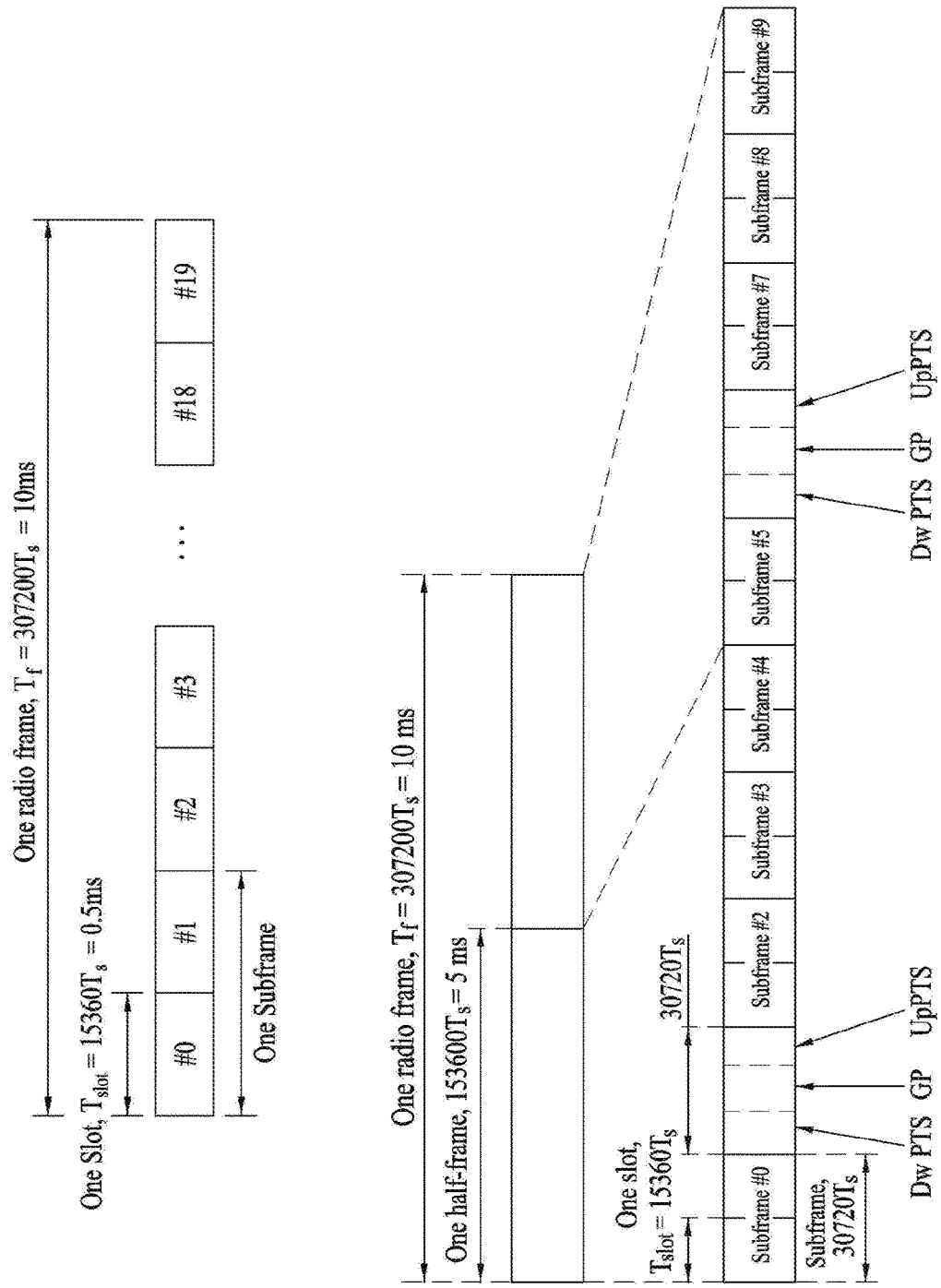
FIG. 1 illustrates the structure of a radio frame used in a wireless communication system.

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present invention, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlink a conventional centralized antenna system (CAS) (i.e. single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g., macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

In a multi-node system according to the present invention, which will be described below, one or more eNBs or eNB controllers connected to plural nodes can control the plural nodes such that signals are simultaneously transmitted to or received from a UE through some or all nodes. While there is a difference between multi-node systems according to the nature of each node and implementation form of each node, multi-node systems are discriminated from single node systems (e.g. CAS, conventional MIMO systems, conventional relay systems, conventional repeater systems, etc.) since a plurality of nodes provides communication services to a UE in a predetermined time-frequency resource. Accordingly, embodiments of the present invention with respect to a method of performing coordinated data transmission using some or all nodes can be applied to various types of multi-node systems. For example, a node refers to an antenna group spaced apart from another node by a predetermined distance or more, in general. However, embodiments of the present invention, which will be described below, can even be applied to a case in which a node refers to an arbitrary antenna group irrespective of node interval. In the case of an eNB including an X-pole (cross polarized) antenna, for example, the embodiments of the preset invention are applicable on the assumption that the eNB controls a node composed of an H-pole antenna and a V-pole antenna.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming). DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present invention, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowledgement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present invention, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/LTE-A has a length of 10 ms (307200 Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | | |
| 5 | $6592 \cdot T_s$ | $4384 \cdot T_s$ | $5120 \cdot T_s$ | $20480 \cdot T_s$ | $4384 \cdot T_s$ | $5120 \cdot T_s$ |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

Figure 2:
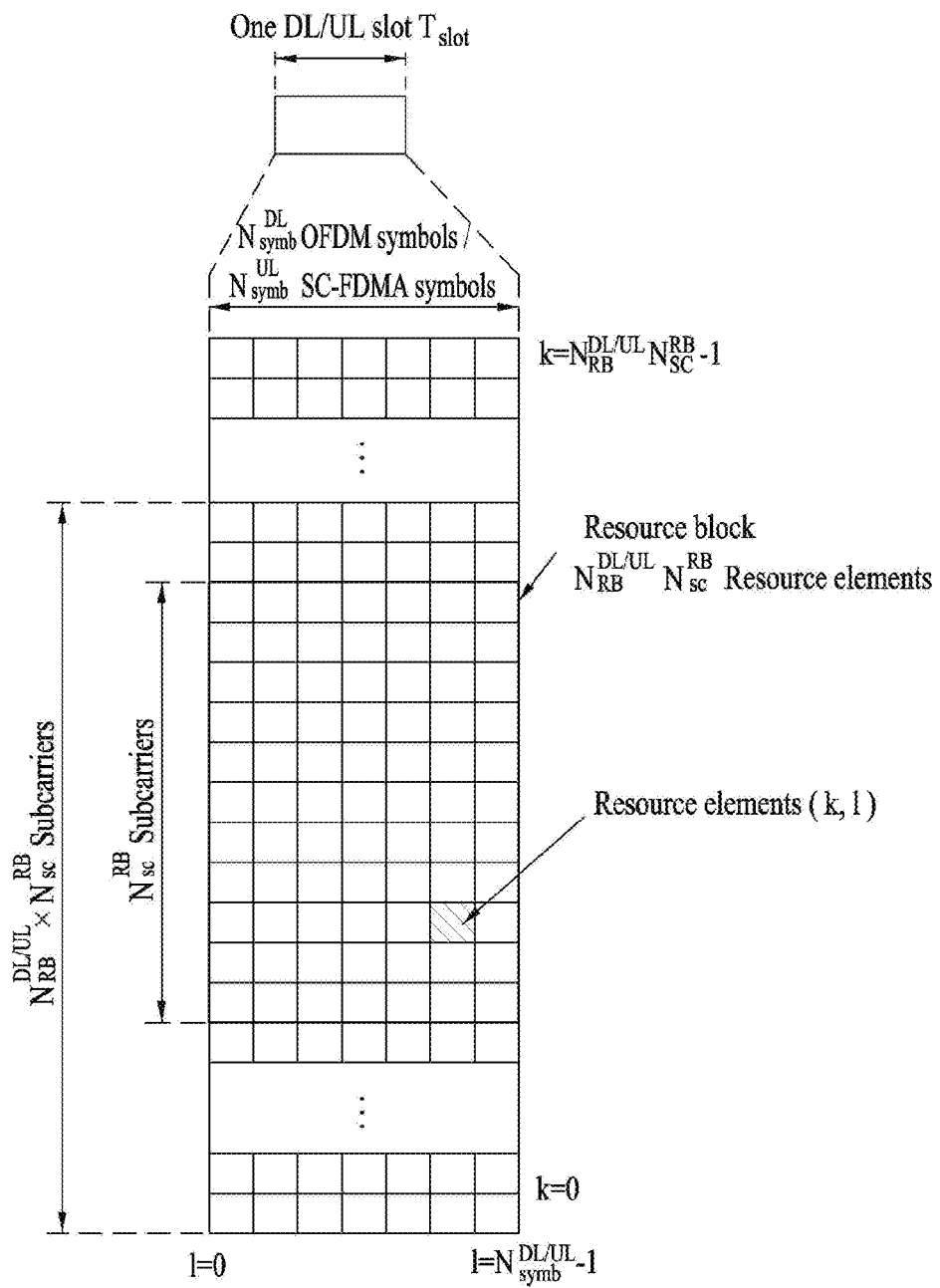
FIG. 2 illustrates the structure of a downlink (DL)/uplink (UL) slot in a wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of subcarriers and OFDM symbols. Here, denotes the number of RBs in a downlink slot and denotes the number of RBs in an uplink slot. and respectively depend on a DL transmission bandwidth and a UL transmission bandwidth. denotes the number of OFDM symbols in the downlink slot and denotes the number of OFDM symbols in the uplink slot. In addition, denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present invention can be equally applied to subframes having different numbers of OFDM symbols. Referring to FIG. 2, each OFDM symbol includes subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by (e.g., 7) consecutive OFDM symbols in the time domain and (e.g., 12) consecutive subcarriers in the frequency domain. For reference, a resource composed by an OFDM symbol and a subcarrier is called a resource element (RE) or a tone. Accordingly, an RB is composed of * REs. Each RE in a resource grid can be uniquely defined by an index pair (k, l) in a slot. Here, k is an index in the range of 0 to *−1 in the frequency domain and l is an index in the range of 0 to −1.

Two RBs that occupy consecutive subcarriers in a subframe and respectively disposed in two slots of the subframe are called a physical resource block (PRB) pair. Two RBs constituting a PRB pair have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, nPRB=nVRB is obtained. Numbers are given to the localized VRBs from 0 to −1, and = is obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

Figure 3:
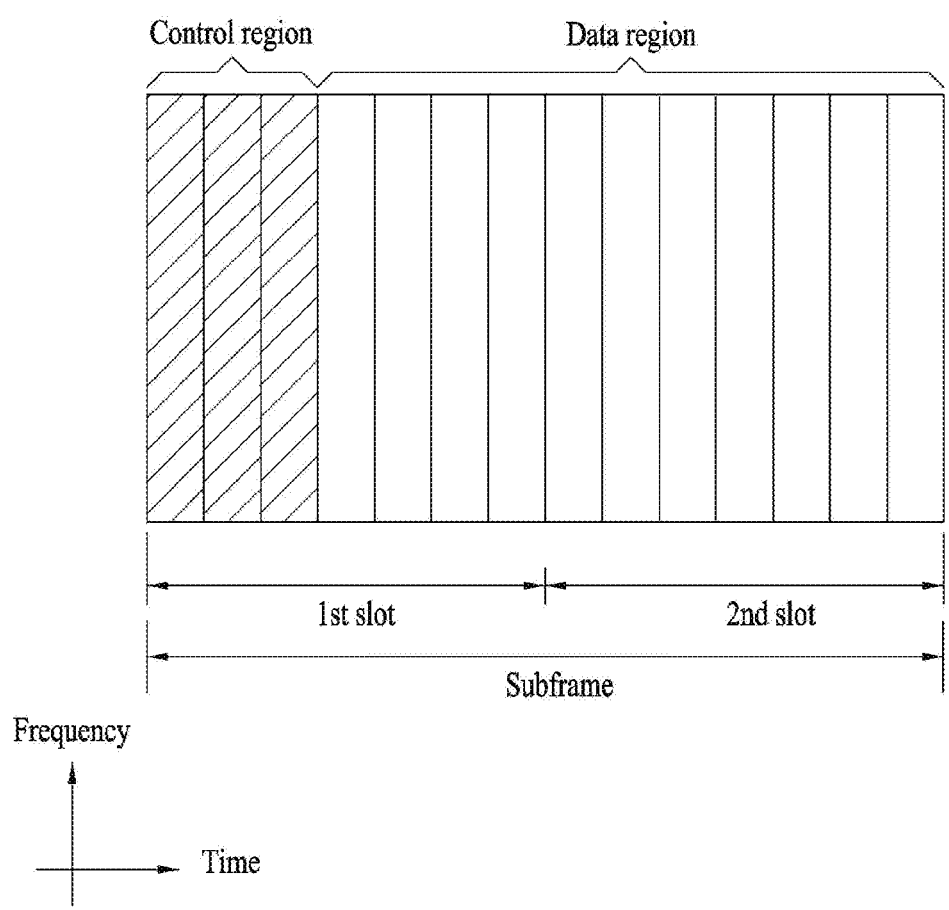
FIG. 3 illustrates the structure of a DL subframe used in a 3GPP LTE/LTE-A system.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. Aggregation levels defining the search space is as follows.

TABLE 3

| Type | Search Space | | Number of PDCCH candidates $M^{(L)}$ |
|---|---|---|---|
| | Aggregation Level L | Size [in CCEs] | |
| UE- | 1 | 6 | 6 |
| specific | 2 | 12 | 6 |
| | 4 | 8 | 2 |
| | 8 | 16 | 2 |
| Common | 4 | 16 | 4 |
| | 8 | 16 | 2 |

A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g., frequency position) of "B" and transmission format information (e.g., transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
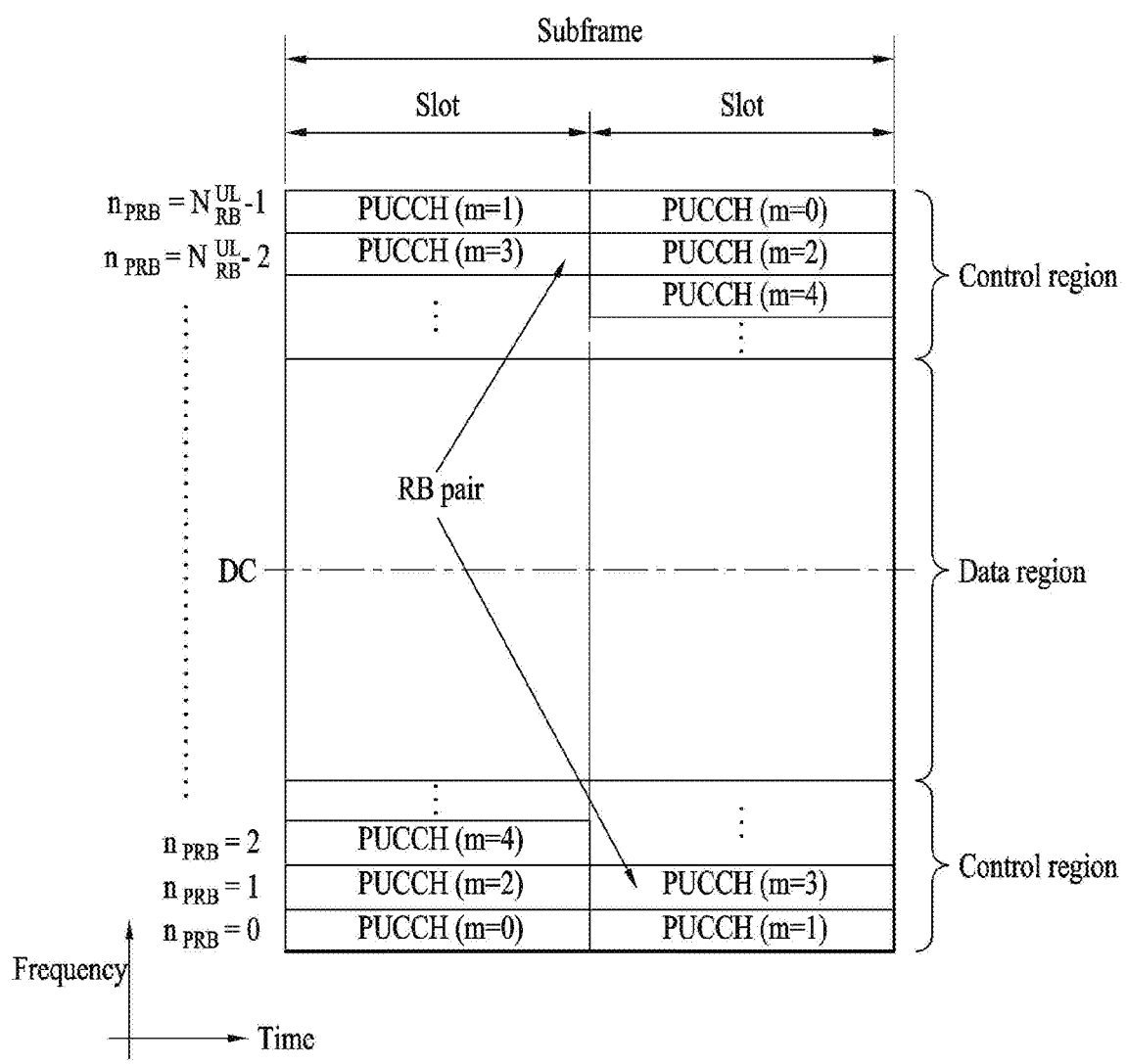
FIG. 4 illustrates the structure of a UL subframe used in the 3GPP LTE/LTE-A system.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (NACK), discontinuous transmission (DTX) and NACK/DTX. Here, the term HARQ-ACK is used interchangeably with the term HARQ ACK/NACK and ACK/NACK.

Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon.

Table 4 shows the mapping relationship between PUCCH formats and UCI in LTE/LTE-A.

TABLE 4

| PUCCH format | Modulation scheme | Number of bits per subframe, $M_{bit}$ | Usage | Etc. |
| --- | --- | --- | --- | --- |
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |

TABLE 4-continued

| PUCCH format | Modulation scheme | Number of bits per subframe, $M_{bit}$ | Usage | Etc. |
| --- | --- | --- | --- | --- |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 4, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

Reference Signal (RS)

When a packet is transmitted in a wireless communication system, signal distortion may occur during transmission since the packet is transmitted through a radio channel. To correctly receive a distorted signal at a receiver, the distorted signal needs to be corrected using channel information. To detect channel information, a signal known to both a transmitter and the receiver is transmitted and channel information is detected with a degree of distortion of the signal when the signal is received through a channel. This signal is called a pilot signal or a reference signal.

When data is transmitted/received using multiple antennas, the receiver can receive a correct signal only when the receiver is aware of a channel state between each transmit antenna and each receive antenna. Accordingly, a reference signal needs to be provided per transmit antenna, more specifically, per antenna port.

Reference signals can be classified into an uplink reference signal and a downlink reference signal. In LTE, the uplink reference signal includes:

i) a demodulation reference signal (DMRS) for channel estimation for coherent demodulation of information transmitted through a PUSCH and a PUCCH; and ii) a sounding reference signal (SRS) used for an eNB to measure uplink channel quality at a frequency of a different network.

The downlink reference signal includes:

i) a cell-specific reference signal (CRS) shared by all UEs in a cell;

ii) a UE-specific reference signal for a specific UE only;

iii) a DMRS transmitted for coherent demodulation when a PDSCH is transmitted;

iv) a channel state information reference signal (CSI-RS) for delivering channel state information (CSI) when a downlink DMRS is transmitted;

v) a multimedia broadcast single frequency network (MBSFN) reference signal transmitted for coherent demodulation of a signal transmitted in MBSFN mode; and vi) a positioning reference signal used to estimate geographic position information of a UE.

Reference signals can be classified into a reference signal for channel information acquisition and a reference signal for data demodulation. The former needs to be transmitted in a wide band as it is used for a UE to acquire channel information on downlink transmission and received by a UE even if the UE does not receive downlink data in a specific subframe. This reference signal is used even in a handover situation. The latter is transmitted along with a corresponding resource by an eNB when the eNB transmits a downlink signal and is used for a UE to demodulate data through channel measurement. This reference signal needs to be transmitted in a region in which data is transmitted.

CSI Report

In a 3GPP LTE(-A) system, a user equipment (UE) reports channel state information (CSI) to a base station (BS) and CSI refers to information indicating quality of a radio channel (or a link) formed between the UE and an antenna port. For example, the CSI includes a rank indicator (RI), a precoding matrix indicator (PMI), a channel quality indicator (CQI), etc. Here, the RI indicates rank information of a channel and means the number of streams received by the UE via the same time-frequency resources. Since the value of the RI is determined depending on long term fading of the channel, the RI is fed from the UE back to the BS with periodicity longer than that of the PMI or the CQI. The PMI has a channel space property and indicates a precoding index preferred by the UE based on a metric such a signal to interference plus noise ratio (SINR). The CQI indicates the strength of the channel and means a reception SINR obtained when the BS uses the PMI.

Based on measurement of the radio channel, the UE may calculate a preferred PMI and RI, which may derive an optimal or best transfer rate when used by the BS, in a current channel state and feed the calculated PMI and RI back to the BS. The CQI refers to a modulation and coding scheme for providing acceptable packet error probability for the fed-back PMI/RI.

Meanwhile, in an LTE-A system which includes more accurate MU-MIMO and explicit CoMP operations, current CSI feedback is defined in LTE and thus may not sufficiently support operations to be newly introduced. As requirements for CSI feedback accuracy become more complex in order to obtain sufficient MU-MIMO or CoMP throughput gain, the PMI is composed of two PMIs such as a long term/wideband PMI (W1) and a short term/subband PMI (W2). In other words, a final PMI is expressed by a function of W1 and W2. For example, the final PMI W may be defined as follows: W=W1*W2 or W=W2*W1. Accordingly, in LTE-A, a CSI may be composed of RI, W1, W2 and CQI.

In the 3GPP LTE(-A) system, an uplink channel used for CSI transmission is shown in Table 5 below.

TABLE 5

| Scheduling scheme | Periodic CSI transmission | Aperiodic CSI transmission |
|---|---|---|
| Frequency non-selective | PUCCH | — |
| Frequency selective | PUCCH | PUSCH |

Referring to Table 5, the CSI may be transmitted using a physical uplink control channel (PUCCH) with periodicity determined by a higher layer or may be aperiodically transmitted using a physical uplink shared channel (PUSCH) according to the demand of a scheduler. If the CSI is transmitted using the PUSCH, only frequency selective scheduling method and an aperiodic CSI transmission method are possible. Hereinafter, the scheduling scheme and a CSI transmission scheme according to periodicity will be described.

1) CQI/PMI/RI Transmission Via PUSCH after Receiving CSI Transmission Request Control Signal.

A control signal for requesting transmission of a CSI may be included in a PUSCH scheduling control signal (UL grant) transmitted via a PDCCH signal. Table 5 below shows the mode of the UE when the CQI, the PMI and the RI are transmitted via the PUSCH.

TABLE 6

|  |  | PMI Feedback Type | | |
|---|---|---|---|---|
|  |  | No PMI | Single PMI | Multiple PMIs |
| PUSCH CQI Feedback Type | Wideband (Wideband CQI) |  |  | Mode 1-2 RI 1st wideband CQI(4 bit) 2nd wideband CQI(4 bit) if RI > 1 N*Subband PMI(4 bit) (N is the total # of subbands) (if 8Tx Ant, N*subband W2 + wideband W1) |
|  | UE selected (Subband CQI) | Mode 2-0 RI (only for Open-loop SM) 1st wideband CQI(4 bit) + Best-M CQI(2 bit) (Best-M CQI: average CQI for selected M SB(s) among N SBs) Best-M index (L bit) |  | Mode 2-2 RI 1st wideband CQI(4 bit) + Best-M CQI(2 bit) 2nd wideband CQI(4 bit) + Best-M CQI(2 bit) if RI > 1 Best-M index (L bit) Wideband PMI(4 bit) + Best-M PMI(4 bit) (if 8Tx Ant, wideband W2 + Best-M W2 + wideband W1) |
|  | Higher Layer-configured | Mode 3-0 RI (only for Open- | Mode 3-1 RI | Mode 3-2 RI |

TABLE 6-continued

| | PMI Feedback Type | | |
|---|---|---|---|
| | No PMI | Single PMI | Multiple PMIs |
| (Subband CQI) | loop SM)<br>1st wideband<br>CQI(4 bit) +<br>N*subbandCQI(2 bit) | 1st wideband<br>CQI(4 bit) +<br>N*subbandCQI(2 bit)<br>2nd wideband<br>CQI(4 bit) +<br>N*subbandCQI(2 bit)<br>if RI > 1<br>Wideband<br>PMI(4 bit)<br>(if 8Tx Ant,<br>wideband W2 +<br>wideband W1) | 1st wideband<br>CQI(4 bit) +<br>N*subbandCQI(2 bit)<br>2nd wideband<br>CQI(4 bit) +<br>N*subbandCQI(2 bit)<br>if RI > 1<br>N*Subband<br>PMI(4 bit)<br>(N is the total # of<br>subbands)<br>(if 8Tx Ant,<br>N*subband W2 +<br>wideband W1) |

The transmission mode of Table 6 is selected at a higher layer and the CQI/PMI/RI is transmitted in the same PUSCH subframe. Hereinafter, an uplink transmission method of the UE according to mode will be described.

Mode 1-2 indicates the case in which a precoding matrix is selected on the assumption that data is transmitted via only a subband with respect to each subband. The UE generates a CQI on the assumption that a precoding matrix is selected with respect to an entire set S specified by a higher layer or a system bandwidth. In Mode 1-2, the UE may transmit the CQI and the PMI value of each subband. At this time, the size of each subband may be changed according to system bandwidth.

In mode 2-0, the UE may select M preferred subbands with respect to the set S specified at the higher layer or the system bandwidth. The UE may generate one CQI value on the assumption that data is transmitted with respect to the selected M subbands. The UE preferably reports one CQI (wideband CQI) value with respect to the set S or the system bandwidth. The UE defines the CQI value of each codeword in the form of a difference if a plurality of codewords is present with respect to the selected M subbands.

At this time, the differential CQI value is determined by a difference between an index corresponding to the CQI value of the selected M subbands and a wideband CQI (WB-CQI) index.

In Mode 2-0, the UE may transmit a CQI value generated with respect to a specified set S or an entire set and one CQI value for the selected M subbands to the BS. At this time, the size of the subband and the M value may be changed according to system bandwidth.

In Mode 2-2, the UE may simultaneously select the locations of M preferred subbands and a single precoding matrix for the M preferred subbands on the assumption that data is transmitted via the M preferred subbands. At this time, the CQI value for the M preferred subbands is defined per codeword. In addition, the UE further generates a wideband CQI value with respect to the specified set S or the system bandwidth.

In Mode 2-2, the UE may transmit information about the locations of the M preferred subbands, one CQI value for the selected M subbands, a single PMI for the M preferred subbands, a wideband PMI and a wideband CQI value to the BS. At this time, the size of the subband and the M value may be changed according to system bandwidth.

In Mode 3-0, the UE generates a wideband CQI value. The UE generates the CQI value for each subband on the assumption that data is transmitted via each subband. At this time, even in case of RI>1, the CQI value indicates only the CQI value for a first codeword.

In Mode 3-1, the UE generates a single precoding matrix with respect to the specified set S or the system bandwidth. The UE generates a subband CQI on a per codeword basis on the assumption of the single precoding matrix generated with respect to each subband. In addition, the UE may generate a wideband CQI on the assumption of a single precoding matrix. The CQI value of each subband may be expressed in the form of a difference. The subband CQI value is calculated by a difference between a subband CQI index and a wideband CQI index. At this time, the size of the subband may be changed according to system bandwidth.

In Mode 3-2, the UE generate a precoding matrix for each subband instead of a single precoding matrix for system bandwidth, to be compared with Mode 3-1.

2) Periodic CQI/PMI/RI Transmission Via PUCCH

The UE may periodically transmit the CSI (e.g., CQI/PMI/RI information) to the BS via the PUCCH. If the UE receives a control signal for requesting transmission of user data, the UE may transmit the CQI via the PUCCH. Even when the control signal is transmitted via the PUSCH, the CQI/PMI/RI may be transmitted using one of the modes defined in Table 7 below.

TABLE 7

| | | PMI feedback type | |
|---|---|---|---|
| | | No PMI | Single PMI |
| PUCCH CQI<br>feedback type | Wideband<br>(wideband CQI) | Mode 1-0 | Mode 1-1 |
| | UE selective<br>(subband CQI) | Mode 2-0 | Mode 2-1 |

The UE may have the transmission modes shown in Table 7. Referring to Table 7, in Mode 2-0 and Mode 2-1, a bandwidth (BP) part is a set of subbands continuously located in a frequency domain and may cover a system bandwidth or a specified set S. In Table 7, the size of each subband, the size of the BP and the number of BPs may be changed according to system bandwidth. In addition, the UE transmits the CQI in a frequency domain in ascending order per BP so as to cover the system bandwidth or the specified set S.

According to a transmission combination of the CQI/PMI/RI, the UE may have the following four transmission types.

i) Type 1: A subband CQI (SB-CQI) of Mode 2-0 and Mode 2-1 is transmitted.

ii) Type 1a: A subband CQI and a second PMI are transmitted.

iii) Type 2, Type 2b, Type 2c: A wideband CQI and a PMI (WB-CQI/PMI) are transmitted.

iv) Type 2a: A wideband PMI is transmitted.

v) Type 3: An RI is transmitted.

vi) Type 4: A wideband CQI is transmitted.

vii) Type 5: An RI and a wideband PMI are transmitted.

viii) Type 6: An RI and a PTI are transmitted.

If the UE transmits the RI and the wideband CQI/PMI, the CQI/PMI is transmitted in subframes having different offsets and periodicities. In addition, if the RI and the wideband CQI/PMI should be transmitted in the same subframe, the CQI/PMI is not transmitted.

The present invention proposes a method of configuring and utilizing two or more CSI-RSs in one CSI process when CSI-RSs are configured for a UE in a frequency division (FD)-MIMO environment to perform channel measurement. The present invention also proposes a resource configuration method and a transmission method for configuring an aperiodic CSI-RS, signaling for an indication method for the transmission, and operations related thereto.

CSI Process Including Multiple CSI-RS Resources

In the case of a beamformed CSI-RS, a situation wherein a CSI-RS that is beamformed in different vertical directions is allocated to a UE and used is considered. To this end, a situation wherein a plurality of CSI-RSs having different "properties" is configured for one CSI process is discussed. The "properties" may be as follows.

RE positions in RBs (mapping)
Transmission period/offset
Transmission subband
Number of antenna ports
Vertical beam
Scrambling ID
Periodic/aperiodic A plurality of CSI-RSs having at least one of the above properties differing thereamong may be configured in one CSI process such that the CSI-RSs are used for different purposes (CSI, RSRP, etc.) according to the properties of each CSI-RS. That is, CSI-RSs may be configured in one CSI process such that CSI on the different CSI-RSs are fed back while the CSI feedback chain is maintained. At this time, if an aperiodic CSI-RS request has been transmitted to the UE and the CSI process has two or more CSI-RSs that may be targets of aperiodic CSI, the UE performs aperiodic CSI reporting on all CSI-RSs configured to be subjected to aperiodic CSI transmission among the CSI-RSs configured in the CSI process.

Configuring a Feedback Method for CSI-RS

Scheme 1. Channel Measurement/Feedback Configuration for Each CSI-RS

Figure 5:
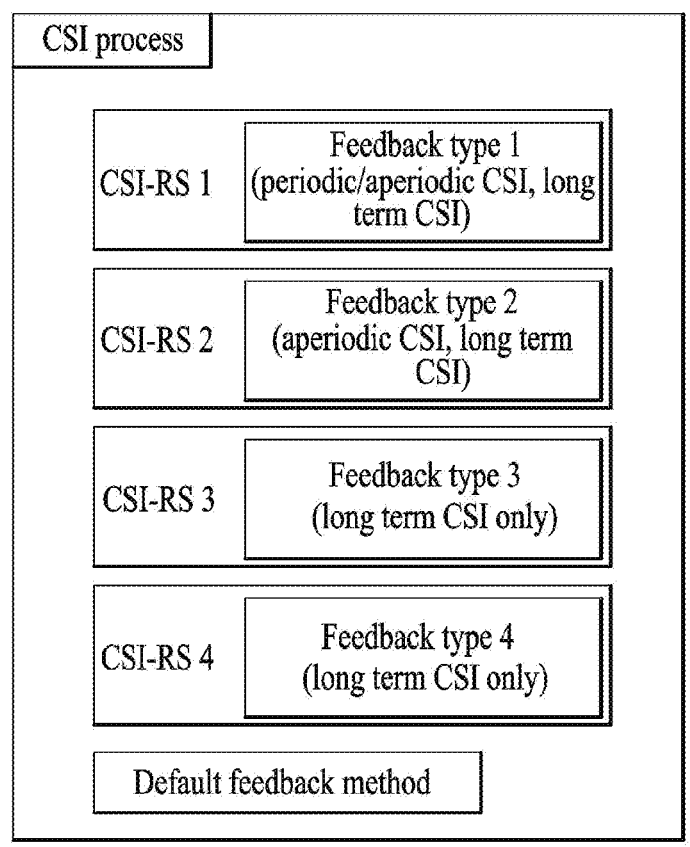
FIG. 5 illustrates a plurality of CSI-RS configurations and a default feedback method within a single CSI process.

Different feedback types may be set for the respective CSI-RSs configured in the CSI process. For example, when four CSI-RSs are designated, the feedback method therefor may be configured as shown in FIG. 5.

In this case, CSI-RS 1 is used to perform periodic and aperiodic CSI reporting, and CSI-RS 2 is used to perform aperiodic CSI reporting. RSRP for each of CSI-RSs 1-4 may be measured/transmitted. The corresponding feedback type may be set to RRC. In this case, the CSI-IM defined in the CSI process may be paired with the CSI-RS (CSI-RS 1, 2 in the above example) that provides CSI feedback and be used for interference measurement.

In the case of the CSI-RS configured as a target of periodic and aperiodic feedback, parameters (e.g., feedback mode, period, offset, etc.) for the corresponding feedback method should be set. The default method of the corresponding CSI process may be used as shown in FIG. 5, and otherwise, the parameters may be set independently for the CSI-RS.

Scheme 2: Defining a 'State' Related to Channel Measurement/Feedback and Setting the 'State' for Each CSI-RS A feedback method may be specified for each CSI-RS by setting the following states and assigning the same to each CSI-RS.

1. Active: The active state is set for a CSI-RS subject to CSI measurement and feedback according to the method configured in the CSI process and a CSI-RS subject to long-term CSI measurement for vertical beam selection.

2. Non-active: The non-active state is set for a CSI-RS that is not involved in CSI feedback configured in the CSI process but is merely subject to long-term CSI measurement for vertical beam selection.

3. Off: The Off state is set for a CSI-RS resource that is not involved in feedback or measurement/feedback of RSRP, but is pre-assigned to the UE so as to be set to the active/non-active state in the future.

Figure 6:
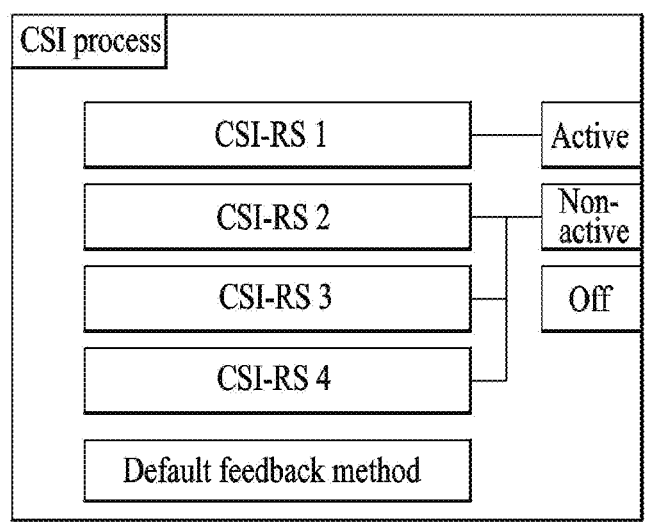
FIG. 6 illustrates a plurality of CSI-RS configurations and states thereof and a default feedback method within a single CSI process.

FIG. 6 illustrates setting of 'states' for each of a plurality of CSI-RS belonging to a single CSI process.

The CSI-IM defined in the CSI process may be used to measure interference in conjunction with the active CSI-RS (CSI-RS 1 in this example).

In this case, the number of CSI-RSs that may be assigned to each state may be limited. For example, the number of CSI-RSs set to the active state may be limited to one, and the number of CSI-RSs set to the non-active state may be limited to three. There may be no CSI-RS that is set to the off state.

Scheme 2 has a default feedback method. In this case, the CSI-RSs included in the corresponding CSI process should be defined within a configuration (for example, a configuration in the same codebook) to which the corresponding feedback method may be applied.

The state of the corresponding CSI-RS may be set as RRC, MAC or DCI. In particular, in the case of the DCI, a CSI-RS that becomes active among the CSI-RSs designated as the non-active state may be designated, and the non-selected CSI-RSs may be assumed to be in the non-active state.

Hierarchy of CSI-RSs

If a plurality of CSI processes is configured, or two or more CSI-RSs are configured in a CSI process, transmission resources may overlap between CSI-RSs. In particular, in the case of periodic/aperiodic CSI, if the CSI-RS corresponding to the periodic CSI report is different from the CSI-RS corresponding to the aperiodic CSI report, it may be necessary to transmit an aperiodic CSI-RS for an aperiodic CSI request. In this case, when the aperiodic CSI-RS resource overlaps the periodic CSI-RS resource, it is preferable that the CSI-RS for the aperiodic CSI request be transmitted and the CSI-RS for the periodic CSI report be dropped.

Alternatively, some CSI-RSs may be CSI-RSs for long-term CSI on vertical CSI-RS selection and other CSI-RSs may be CSI-RSs for short-term CSI on horizontal CSI measurement/transmission for a selected vertical beam. In this case, if the transmission resources for the CSI-RS for the long-term CSI overlap the CSI-RS resources for the short-term CSI (such as, for example, time, frequency, beam, etc.), the CSI-RS for the long-term CSI may be transmitted and the CSI-RS for the short-term CSI may be dropped. That is, the following CSI-RS hierarchy is possible.

Level 3: Aperiodic CSI-RS
Level 2: Long-term CSI-RS
Level 1: Short-term CSI-RS

When a transmission resource of a higher level CSI-RS overlaps a transmission resource of a lower level CSI-RS, the higher level CSI-RS may be transmitted and the lower level CSI-RS may be dropped.

Aperiodic CSI-RS

When a plurality of CSI-RS resources is included in one CSI process as described above, one of the resources may be for an aperiodic CSI-RS, or only a single aperiodic CSI-RS resource or configuration may be included in the CSI process. In the following description of the present invention, it is basically assumed that a plurality of CSI-RS resources is included in one CSI process as in the former case, but it is evident that the following detailed description is also applicable to the latter case. Setting of the characteristics (RE position (mapping), transmission subband, scrambling ID, etc. in the RB) other than the time for the aperiodic CSI-RS may be preconfigured through higher-layer signaling or the like. The aperiodic CSI-RS may be measured/transmitted as an aperiodic CSI, or be considered as an aperiodic CSI-RS for another UE and ignored, depending on whether or not an aperiodic CSI request is received.

The aperiodic CSI-RSs may be divided according to how the resources are configured and used.

Scheme 1: transmission of an aperiodic CSI-RS may be performed within a preconfigured CSI-RS resource pool. In particular, to avoid using additional CSI-RS resources, the aperiodic CSI-RS may be transmitted using resources already allocated to periodic CSI-RS transmission. In this case, if there is no transmission of the aperiodic CSI-RS, the corresponding resource is used for the existing periodic CSI-RS transmission. Hereinafter, additional techniques will be described on the basis of "a case of transmitting the aperiodic CSI-RS using resources already allocated to periodic CSI-RS transmission". However, the details given below may also be applied even when an independent aperiodic CSI-RS transmission resource separated from the periodic CSI-RS transmission resource is considered. In this case, the following specific indicators or UE operations may be applied only in relation to the corresponding aperiodic CSI-RS transmission and may be operated independently of other periodic CSI-RS configurations.

The base station may transmit an aperiodic CSI-RS indication to the UE, thereby informing the UE of transmission of the aperiodic CSI-RS. The "aperiodic CSI-RS indication" may be an explicit signaling message separate from the "aperiodic CSI request". In this case, the "aperiodic CSI-RS indication" may be construed as indicating an actual transmission instance of the corresponding aperiodic CSI-RS. Alternatively, the "aperiodic CSI-RS indication" may not be provided separately, but may be signaled implicitly in connection with the "aperiodic CSI request". The aperiodic CSI-RS indication indicates that an aperiodic CSI-RS having a different configuration from the existing CSI-RS has been transmitted instead of the existing CSI-RS subjected to periodic transmission. Therefore, the UE should not use a CSI-RS transmitted in the corresponding subframe for periodic CSI reporting. Instead, the aperiodic CSI-RS sent in the corresponding subframe may be used for an aperiodic CSI request according to the aperiodic CSI request. That is, a UE receiving both the aperiodic CSI-RS indication and the aperiodic CSI request may measure or transmit aperiodic CSI that uses the corresponding aperiodic CSI-RS, on the assumption that the CSI-RS is transmitted on an aperiodic CSI-RS resource. In addition, a UE receiving only the aperiodic CSI-RS indication may construe the aperiodic CSI-RS indication as a dynamic zero power (ZP) CSI-RS indication and may thus operate, recognizing that data has not been transmitted in the corresponding subframe as in the case where the aperiodic CSI-RS resource is rate-matched.

The aperiodic CSI-RS indication may be transmitted using DCI. When the UE receives an aperiodic CSI-RS indication signal in subframe n, the transmission time of the aperiodic CSI-RS may be given as follows.

1. The transmission time of the aperiodic CSI-RS may be construed as subframe n+p. In this case, p is an aperiodic CSI-RS transmission delay, and the UE may be informed thereof by explicitly transmitting p in the aperiodic CSI-RS indication field of the DCI.

2. Without extra signaling, it may be interpreted that an aperiodic CSI-RS is transmitted in subframe n+p, using a predefined constant p.

A. In particular, when p=0, an aperiodic CSI-RS may be transmitted in the same subframe as the transmission timing of the aperiodic CSI-RS indication.

In accordance with the method of indicating each aperiodic CSI-RS transmission time, the corresponding signal may be structured as follows.

1. An integer between [0, P] or an integer representing "no aperiodic CSI-RS state" is transmitted as p. P is the maximum aperiodic CSI-RS transmission delay and requires P+2 states including "no aperiodic CSI-RS state", i.e., $\log_2(P+2)$ bits in total. The following table summarizes an example for P=6.

TABLE 8

| Index | Description |
| --- | --- |
| 0 | No aperiodic CSI-RS transmission |
| 1 | p = 0 |
| 2 | Delay 1, Subframe p = 1 |
| 3 | Delay 2, Subframe p = 2 |
| 4 | Delay 3, Subframe p = 3 |
| 5 | Delay 4, Subframe p = 4 |
| 6 | Delay 5, Subframe p = 5 |

Alternatively, in place of the delay, a previous aperiodic CSI-RS transmitted before the reception time of the aperiodic CSI-RS indication may be indicated. In this case, the transmission time of the aperiodic CSI-RS may be construed as the time of subframe n-p, and a table such as Table 8 above may be used without modification. Instead, the meaning of the table above may be changed to an aperiodic CSI-RS instance indication from the aperiodic CSI-RS transmission delay.

The aperiodic CSI-RS instance indicator may be signaled in units of aperiodic CSI-RS resource as shown in Table 9. That is, the UE may report aperiodic CSI using the first aperiodic CSI-RS or the second aperiodic CSI-RS with respect to the reception time of the aperiodic CSI-RS indication according to the corresponding field value.

TABLE 9

| Index | Description |
| --- | --- |
| 0 | The most recent instance of CSI-RS resource X |
| 1 | The second most recent instance of CSI-RS resource X |

2. Alternatively, the base station may transmit only an on/off indication of the aperiodic CSI-RS in the form of {0, 1} as an aperiodic CSI-RS indication. An example is disclosed below.

TABLE 10

| Index | Description |
| --- | --- |
| 0 | No aperiodic CSI-RS |
| 1 | Aperiodic CSI-RS transmission |

The DCI may be transmitted as cell-common DCI using an SI-RNTI. In this case, the UE using the cell ID of the corresponding cell may receive and use the DCI such as DCIs 1A and 1C through the aperiodic CSI-RS indication. In this case, the base station may transmit the aperiodic CSI-RS indication to the UE using the space added to the existing DCI. The size of the space is determined according to the method of indicating the aperiodic CSI-RS transmission time described above.

Figure 7:
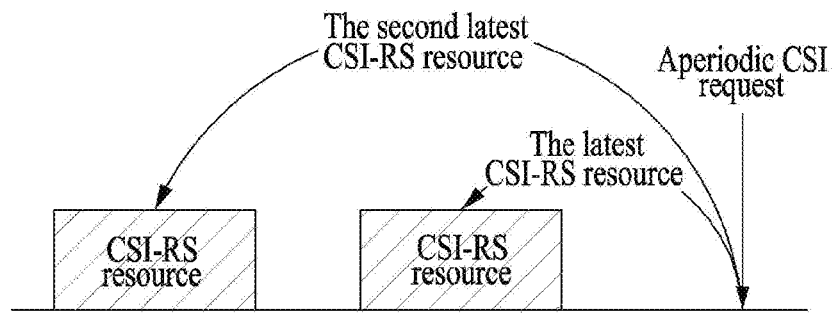
FIG. 7 illustrates an aperiodic CSI request and a target CSI-RS resource thereof according to an embodiment of the present invention.

Alternatively, when the SI-RNTI is used in DCI 1A, the aperiodic CSI-RS indication may be transmitted using a part of the reserved space. For example, when the SI-RNTI is used as shown in FIG. 7, a space corresponding to a HARQ process number (which is defined using 3 bits for FDD and 4 bits for TDD) and a DL allocation index (which is defined using 2 bits for TDD only) is reserved. If K aperiodic CSI-RSs (CSI-RS resources) are defined, K bits in the reserved space may be used to notify the UE in the cell of on/off of each aperiodic CSI-RS in a bitmap format. Here, K should be less than or equal to the size of the available space. If FDD is used and a space corresponding to the HARQ process number is used, K may be less than or equal to 3.

Alternatively, the aperiodic CSI-RS indication may be broadcast using DCI such as DCI format 3/3A.

In this case, the DCI may be transmitted using an RNTI for use in broadcast such as the SI-RNTI or a separate RNTI such as an aperiodic-CSI-RS-RNTI, which is only used for the corresponding information.

Alternatively, the DCI may be transmitted as UE-specific DCI using the C-RNTI. In this case, the base station may transmit the aperiodic CSI-RS indication to the UE using the space added to the existing DCI. In particular, the indication may be transmitted together with an aperiodic CSI request, using UL DCI (DCI format 0 or 4). The size of the space is determined according to the method of indicating the aperiodic CSI-RS transmission time described above.

A UE receiving both the aperiodic CSI-RS indication and the aperiodic CSI request measures/transmits aperiodic CSI that uses the corresponding aperiodic CSI-RS, on the assumption that the CSI-RS is transmitted on an aperiodic CSI-RS resource of the corresponding time. In particular, a UE that is performing CSI averaging does not use the corresponding subframe for the periodic CSI average in this case, and a UE that performs RRM measurement using the aperiodic CSI-RS does not use the CSI-RS transmitted on the corresponding aperiodic CSI-RS resource in performing RRM measurement.

A UE that receives only an aperiodic CSI-RS indication and does not receive an aperiodic CSI request in a specific subframe may construe the aperiodic CSI-RS indication as the dynamic ZP CSI-RS indication. That is, the UE may operate in the corresponding subframe as if the CSI-RS is not transmitted, assuming that the aperiodic CSI-RS resource is rate-matched. A UE that is performing CSI averaging as in the previous case does not use the corresponding subframe for CSI averaging in this case, and a UE performing measurement of radio resource management (RRM) using the periodic CSI-RS does not use the CSI-RS transmitted on the aperiodic CSI-RS resource in performing RRM measurement.

Figure 8:
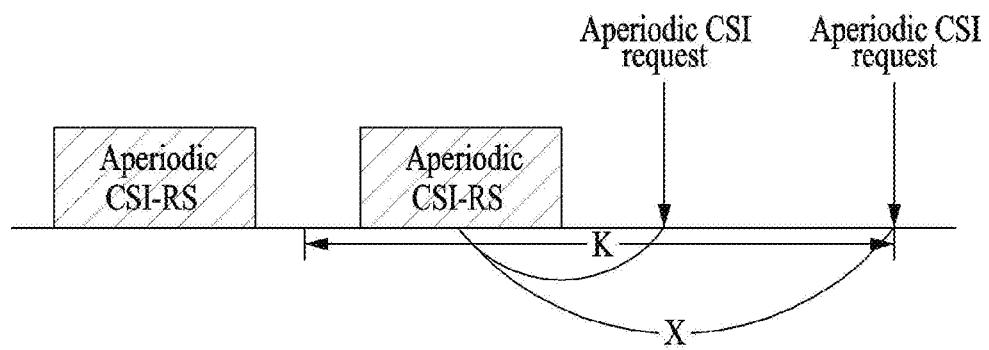
FIG. 8 illustrates an aperiodic CSI request and a target CSI-RS resource thereof according to an embodiment of the present invention.

The UE receiving the aperiodic CSI request reports or transmits aperiodic CSI on an aperiodic CSI-RS when the aperiodic CSI-RS satisfies the following conditions. Here, it is assumed that the UE receives an aperiodic CSI request after transmitting an aperiodic CSI-RS. FIG. 8 illustrates the conditions.

An aperiodic CSI-RS was transmitted within K subframes before the time of reception of an aperiodic CSI request; and An aperiodic CSI-RS that has not been previously used for aperiodic CSI reporting is transmitted.

In this case, the base station may transmit an aperiodic CSI request to the UE after transmission of an aperiodic CSI-RS indication and before transmission of the next aperiodic CSI-RS indication such that the aperiodic CSI can reference the correct aperiodic CSI-RS.

Figure 9:
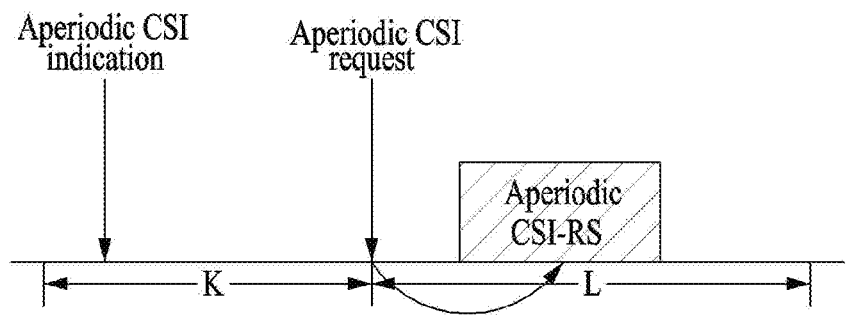
FIG. 9 illustrates an aperiodic CSI request and a target CSI-RS resource thereof according to an embodiment of the present invention.

Alternatively, when there is an aperiodic CSI-RS satisfying the following conditions, aperiodic CSI on the aperiodic CSI-RS may be transmitted. Here, it is assumed that the UE receives an aperiodic CSI request after transmitting an aperiodic CSI-RS. FIG. 9 illustrates the conditions.

An aperiodic CSI-RS indication was received within K subframes before the time of reception of an aperiodic CSI request; and An aperiodic CSI-RS to be transmitted within L subframes after the reception time of the aperiodic CSI request is transmitted.

K and L denote aperiodic CSI-RS valid periods, and may be transmitted to the UE through predefined signaling or higher layer signaling. If there is no corresponding aperiodic CSI-RS, the UE may transmit CSI on a CSI-RS configured as a target of aperiodic CSI, for example, the existing periodic CSI-RS among other CSI-RSs included in the CSI process specified in the aperiodic CSI request.

In particular, the aperiodic CSI request may be configured to perform the function of the aperiodic CSI-RS indication. In this case, when the reception time of the aperiodic CSI request is subframe n, subframe n−k, the time point at which the aperiodic CSI-RS is transmitted, should be defined based on subframe n. The transmission time may be specified in the aperiodic CSI request as shown in the table below, or may be predefined (e.g., the aperiodic CSI-RS is received at the subframe at which the aperiodic CSI request is transmitted/received as k=0).

TABLE 11

| Index | Aperiodic CSI request |
| --- | --- |
| 00 | No aperiodic CSI request |
| 01 | Aperiodic CSI request for CSI process 0 |
| 10 | Aperiodic CSI request, k = 0 |
| 11 | Aperiodic CSI request, k = 4 |

The aperiodic CSI-RS indication may be separately transmitted even when the aperiodic CSI-RS indication is included in the aperiodic CSI request. In this case, however, the aperiodic CSI-RS indication transmitted separately is used only as the dynamic ZP-CSI-RS indication.

Scheme 2: A separate resource pool for the aperiodic CSI-RS may be configured to configure separate aperiodic CSI-RS resources for the aperiodic CSI-RS. The corresponding CSI-RS resources may be configured in the UE through higher layer signaling such as RRC. The configurations may be divided as follows according to the operation performed when the aperiodic CSI-RS is not transmitted on the corresponding aperiodic CSI-RS resource.

2-1. When the aperiodic CSI-RS is not transmitted, the corresponding resource may be used for other purposes such as data transmission.

On the other hand, when the aperiodic CSI-RS is transmitted on a corresponding resource, the aperiodic CSI-RS indication on the resource may be construed as a ZP-CSI-RS. That is, when the aperiodic CSI-RS is transmitted, the corresponding resource may be considered to be rate-matched if a UE that does not use the aperiodic CSI-RS receives the aperiodic CSI-RS indication.

2-2. When the aperiodic CSI-RS is not transmitted, the corresponding resource is reserved. That is, the resource is not used for other purposes than transmission of the aperiodic CSI-RS.

In operation using the aperiodic CSI-RS of Scheme 2, the method of Scheme 1 may be used. That is, as in operation of Scheme 1, a UE receiving both the aperiodic CSI-RS indication and the aperiodic CSI request measures/transmits aperiodic CSI that uses the corresponding aperiodic CSI-RS, on the assumption that the aperiodic CSI-RS is transmitted on an aperiodic CSI-RS resource. In addition, a UE receiving only the aperiodic CSI-RS indication may construe the aperiodic CSI-RS indication as a dynamic ZP CSI-RS indication and may thus operate, recognizing that data has not been transmitted in the corresponding subframe as in the case where the aperiodic CSI-RS resource is rate-matched.

The following method may be used to configure the aperiodic CSI-RS resource.

Configuring periodic resources for aperiodic CSI-RS transmission

In this case, the transmission position of the aperiodic CSI-RS may be indicated in units of preconfigured aperiodic CSI-RS resources.

Configuring aperiodic resources for aperiodic CSI-RS transmission

Aperiodic CSI-RS transmission subframes may be configured directly into a bitmap (e.g., subframe by subframe).

Periodic CSI-RS transmission position may be configured, and subframes which are not used for transmission may be predefined or may be configured in a bitmap.

Directly indicating aperiodic CSI-RS transmission timing

The aperiodic CSI-RS transmission timing may not be predefined and the instances of actual transmission of the aperiodic CSI-RS on the preconfigured aperiodic CSI-RS resources may be directly signaled through, for example, an aperiodic CSI-RS indication. This indication is made through the aperiodic CSI-RS indication described below.

The aperiodic CSI-RS configuration described above may be predefined or may be set in the UE through higher layer signaling such as RRC.

The aperiodic CSI-RS indication may be transmitted using the DCI as in Scheme 1 described above. When the UE receives an aperiodic CSI-RS indication signal in subframe n, the transmission time of the aperiodic CSI-RS may be given as follows.

1. The transmission time of the aperiodic CSI-RS may be construed as subframe n+p. In this case, p is an aperiodic CSI-RS transmission delay, and the UE may be informed thereof by explicitly transmitting p in the aperiodic CSI-RS indication field of the DCI.

2. Without extra signaling, it may be interpreted that an aperiodic CSI-RS is transmitted in subframe n+p, using a predefined constant p.

A. In particular, when p=0, an aperiodic CSI-RS may be transmitted in the same subframe as the transmission timing of the aperiodic CSI-RS indication.

In accordance with the method of indicating each aperiodic CSI-RS transmission time, the corresponding signal may be structured as follows.

1. An integer between [0, P] or an integer representing "no aperiodic CSI-RS state" is transmitted as p. P is the maximum aperiodic CSI-RS transmission delay and requires P+2 states including "no aperiodic CSI-RS state", i.e., $\log_2(P+2)$ bits in total. See Table 10.

Alternatively, in place of the delay, a previous aperiodic CSI-RS transmitted before the reception time of the aperiodic CSI-RS indication may be indicated. In this case, the transmission time of the aperiodic CSI-RS may be construed as the time of subframe n-p, and a table such as Table 8 above may be used without modification. Instead, the meaning of the table above may be changed to an aperiodic CSI-RS instance indication from the aperiodic CSI-RS transmission delay.

The aperiodic CSI-RS instance indicator may be signaled in units of aperiodic CSI-RS resource as shown in Table 11. That is, the UE may report aperiodic CSI using the first aperiodic CSI-RS or the second aperiodic CSI-RS with respect to the reception time of the aperiodic CSI-RS indication according to the corresponding field value.

2. Alternatively, the base station may transmit only an on/off indication of the aperiodic CSI-RS in the form of {0, 1} as an aperiodic CSI-RS indication. An example is disclosed below.

The DCI may be transmitted as cell-common DCI using an SI-RNTI. In this case, the UE using the cell ID of the corresponding cell may receive and use the DCI such as DCIs 1A and 1C through the aperiodic CSI-RS indication. In this case, the base station may transmit the aperiodic CSI-RS indication to the UE using the space added to the existing DCI. The size of the space is determined according to the method of indicating the aperiodic CSI-RS transmission time described above.

Alternatively, when the SI-RNTI is used in DCI 1A, the aperiodic CSI-RS indication may be transmitted using a part of the reserved space. For example, when the SI-RNTI is used as shown in FIG. 7, a space corresponding to a HARQ process number (which is defined using 3 bits for FDD and 4 bits for TDD) and a DL allocation index (which is defined using 2 bits for TDD only) is reserved. If K aperiodic CSI-RSs (CSI-RS resources) are defined, K bits in the reserved space may be used to notify the UE in the cell of on/off of each aperiodic CSI-RS in a bitmap format. Here, K should be less than or equal to the size of the available space. If FDD is used and a space corresponding to the HARQ process number is used, K may be less than or equal to 3.

Alternatively, the aperiodic CSI-RS indication may be broadcast using DCI such as DCI format 3/3A.

In this case, the DCI may be transmitted using an RNTI for use in broadcast such as the SI-RNTI or a separate RNTI such as an aperiodic-CSI-RS-RNTI, which is only used for the corresponding information.

Alternatively, the DCI may be transmitted as UE-specific DCI using the C-RNTI. In this case, the base station may transmit the aperiodic CSI-RS indication to the UE using the space added to the existing DCI. In particular, the indication may be transmitted together with an aperiodic CSI request, using UL DCI (DCI format 0 or 4). The size of the space is determined according to the method of indicating the aperiodic CSI-RS transmission time described above.

A UE receiving both the aperiodic CSI-RS indication and the aperiodic CSI request measures/transmits aperiodic CSI that uses the corresponding aperiodic CSI-RS, on the assumption that the CSI-RS is transmitted on an aperiodic CSI-RS resource of the corresponding time. In particular, a UE that is performing CSI averaging does not use the corresponding subframe for the periodic CSI average in this case, and a UE that performs RRM measurement using the aperiodic CSI-RS does not use the CSI-RS transmitted on the corresponding aperiodic CSI-RS resource in performing RRM measurement.

A UE that receives only an aperiodic CSI-RS indication and does not receive an aperiodic CSI request in a specific subframe may construe the aperiodic CSI-RS indication as the dynamic ZP CSI-RS indication. That is, the UE may operate in the corresponding subframe as if the CSI-RS is not transmitted, assuming that the aperiodic CSI-RS resource is rate-matched. A UE that is performing CSI averaging as in the previous case does not use the corresponding subframe for CSI averaging in this case, and a UE performing measurement of radio resource management (RRM) using the periodic CSI-RS does not use the CSI-RS transmitted on the aperiodic CSI-RS resource in performing RRM measurement.

For the aperiodic CSI request, the method of Scheme 1 described above can be used. Specifically, the UE reports or transmits aperiodic CSI on an aperiodic CSI-RS when the aperiodic CSI-RS satisfies the following conditions. Here, it is assumed that the UE receives an aperiodic CSI request after aperiodic CSI-RS transmission of the base station.

An aperiodic CSI-RS was transmitted within K subframes before the time of reception of an aperiodic CSI request; and An aperiodic CSI-RS that has not been previously used for aperiodic CSI reporting is transmitted.

In this case, the base station may transmit an aperiodic CSI request to the UE after transmission of an aperiodic CSI-RS indication and before transmission of the next aperiodic CSI-RS indication such that the aperiodic CSI can reference the correct aperiodic CSI-RS.

Alternatively, when there is an aperiodic CSI-RS satisfying the following conditions, aperiodic CSI on the aperiodic CSI-RS may be transmitted. Here, it is assumed that the UE receives an aperiodic CSI request after transmitting an aperiodic CSI-RS. FIG. 9 illustrates the conditions.

An aperiodic CSI-RS indication was received within K subframes before the time of reception of an aperiodic CSI request; and An aperiodic CSI-RS to be transmitted within L subframes after the reception time of the aperiodic CSI request is transmitted.

K and L denote aperiodic CSI-RS valid periods, and may be transmitted to the UE through predefined signaling or higher layer signaling. If there is no corresponding aperiodic CSI-RS, the UE may transmit CSI on a CSI-RS configured as a target of aperiodic CSI, for example, the existing periodic CSI-RS among other CSI-RSs included in the CSI process specified in the aperiodic CSI request.

In particular, the aperiodic CSI request may be configured to perform the function of the aperiodic CSI-RS indication. In this case, when the reception time of the aperiodic CSI request is subframe n, subframe n-k, the time point at which the aperiodic CSI-RS is transmitted, should be defined based on subframe n. The transmission time may be specified in the aperiodic CSI request as shown in Table 13, or may be predefined (e.g., the aperiodic CSI-RS is received at the subframe at which the aperiodic CSI request is transmitted/received as k=0).

The aperiodic CSI-RS indication may be separately transmitted even when the aperiodic CSI-RS indication is included in the aperiodic CSI request. In this case, however, the aperiodic CSI-RS indication is used only as the dynamic ZP-CSI-RS indication.

Processing of Multiple Aperiodic CSI-RS Transmissions

When an aperiodic CSI-RS is transmitted for two or more UEs and transmission timing points of aperiodic CSI-RSs for the UEs are adjacent to each other, there may be a plurality of aperiodic CSI-RSs satisfying the above conditions in view of the UEs. In particular, when the same resource is used for the aperiodic CSI-RS, and the aperiodic CSI is transmitted to the UEs, the UEs need to determine an aperiodic CSI-RS to be subjected to aperiodic CSI transmission among the plurality of aperiodic CSI-RSs.

To this end, the following methods may be used.

1. The base station may directly designate, in an aperiodic CSI request, an aperiodic CSI-RS for the UE to reference to send an aperiodic CSI report. To this end, a field such as an aperiodic CSI-RS transmission instance indication in the aperiodic CSI-RS indication may be added to the DCI including an aperiodic CSI request.

For example, the structure of the aperiodic CSI-RS transmission instance indication may be given as follows. The aperiodic CSI-RS transmission instance indication may indicate a previous aperiodic CSI-RS transmitted before the reception time of the aperiodic CSI-RS indication. In this case, the transmission time of the aperiodic CSI-RS may be construed as subframe n-p, and may be defined as shown in the following table. p is the maximum aperiodic CSI-RS transmission delay and requires $\log_2(P+2)$ bits. The following table summarizes the example for p=7.

TABLE 12

| Index | Description |
|---|---|
| 0 | p = 0 (same subframe) |
| 1 | p = 1 (before one subframe) |
| 2 | p = 2 (before 2 subframes) |
| 3 | p = 3 (before 3 subframes) |
| 4 | p = 4 (before 4 subframes) |
| 5 | p = 5 (before 5 subframes) |
| 6 | p = 6 (before 6 subframes) |
| 7 | p = 7 (before 7 subframes) |

2. The aperiodic CSI-RS indication may be included in the aperiodic CSI request. For example, when the reception timing of the aperiodic CSI request is subframe n and the reception timing of the aperiodic CSI-RS is subframe n-k, the configuration for the state of the aperiodic CSI request may be set to RRC as follows.

TABLE 13

| Index | Description |
|---|---|
| 00 | No aperiodic CSI request |
| 01 | Aperiodic CSI request for CSI process 0 |
| 10 | k = 0, an aperiodic CSI request for CSI process 1 |
| 11 | k = 4, an aperiodic CSI request for CSI process 1 |

In the example above, when an aperiodic CSI-RS is included in CSI process 1, the base station may transmit the index "11" through the aperiodic CSI request and receive a report on the aperiodic CSI based on the aperiodic CSI-RS transmitted in subframe n-4.

3. The ambiguity of the aperiodic CSI-RS may be lowered by configuring a plurality of aperiodic CSI-RS resources instead of selecting a measurement target CSI-RS through the aperiodic CSI-RS indication. The plurality of aperiodic CSI-RS resources may be mapped to different RE positions or may be mapped to the same RE position and be set to be transmitted at different timings by setting different transmission periods and offsets. For example, if two aperiodic CSI-RS resources are set to share the same RE position, then the aperiodic CSI-RS resources are alternately configured in the time domain.

In the method of item 3, the UE basically transmits aperiodic CSI for an aperiodic CSI-RS resource configured therefor. However, if two or more aperiodic CSI-RS resources are configured for the UE (particularly, within one CSI process), an aperiodic CSI-RS to be subjected to aperiodic CSI reporting between the aperiodic CSI-RS resources may be indicated through the aperiodic CSI request. The following table shows an example of indicating a specific aperiodic CSI-RS resource in an aperiodic CSI request.

TABLE 14

| Index | Description |
|---|---|
| 00 | No aperiodic CSI request |
| 01 | Aperiodic CSI request for CSI process 0 |
| 10 | Aperiodic CSI request for aperiodic CSI-RS resource 1 |
| 11 | Aperiodic CSI request for aperiodic CSI-RS resource 2 |

Alternatively, an aperiodic CSI-RS indication independent of the aperiodic CSI request may be transmitted.

In the above, it is apparent that the "operation related to two or more aperiodic CSI-RS resources" can also be defined as an "operation of configuring, a higher layer signal, two or more specific configuration (e.g., RE/timing pattern, number of antenna ports, subset of antenna ports, etc.) candidate sets that one aperiodic CSI-RS resource can have and dynamically indicating the same through DCI". In particular, the timing pattern may indicate the transmission time of the aperiodic CSI-RS as described above, and may include a plurality of aperiodic timing points. When $n_{ap}$ transmission timing points of the aperiodic CSI-RS are indicated in the timing pattern, this may be interpreted as meaning that ($n_{ap}$+1) aperiodic CSI-RSs including the time when the UE receives the aperiodic CSI-RS indication are transmitted.

For example, in consideration of flexibility of the aperiodic CSI-RS, a plurality of configurations (e.g., RE/timing pattern, number of antenna ports, antenna port subset, etc.) may be established for one aperiodic CSI-RS (or resource), and one of the configurations may be selected through signaling such as DCI to inform the UE of the configuration that is actually used for aperiodic CSI-RS transmission. In addition, when there are two or more aperiodic CSI-RS resources in a single CSI process, each configuration may be independently established for each resource. In particular, each configuration may be defined in a candidate set (e.g., RE/timing pattern, number of antenna ports, antenna port subset, etc.), and the base station may designate a specific configuration actually used for aperiodic CSI-RS transmission using a method such as DCI. For example, when the state '10' is dynamically indicated by the DCI, the UE uses a set corresponding to the state '10' among the two or more configuration candidate sets independently set for each aperiodic CSI-RS resource to measure the corresponding aperiodic CSI-RS.

Alternatively, when there are two or more aperiodic CSI-RS resources in a CSI process, there may be an aperiodic CSI resource configuration (e.g., RE/timing pattern, number of antenna ports, antenna port subset, etc.) common to all (or some) configured aperiodic CSI-RS resources in the CSI process, the configuration may be established with a plurality of candidate sets (e.g., RE/timing pattern, number of antenna ports, antenna port subset, etc.), and the base station may designate a specific configuration actually used for aperiodic CSI-RS transmission using a method such as aperiodic DCI.

Following this method, setting of a specific parameter (e.g., the number of antenna ports) may be semi-statically defined for each aperiodic CSI-RS resource in the CSI process through RRC signaling, and a plurality of aperiodic CSI-RS resource configuration candidate sets (e.g., RE/timing patterns, number of antenna ports, antenna port subset, etc.) common to all (or some) of the aperiodic CSI-RS resources in the CSI process may be defined for the other parameters. Thereby, the base station may designate a specific configuration actually used for aperiodic CSI-RS transmission using a method such as aperiodic DCI. For example, when the state '10' is dynamically indicated by the DCI, the UE uses a set corresponding to the state '10' among the candidate sets configured as common sets and a set corresponding to the state '10' among the two or more configuration candidate sets independently set for each aperiodic CSI-RS resource to measure the aperiodic CSI-RSs (in the CSI process).

In addition, when there are two or more aperiodic CSI-RSs subject to aperiodic CSI feedback, only the most recently transmitted aperiodic CSI-RS may be used for CSI measurement. For example, when an aperiodic CSI request is transmitted in subframe n, and the aperiodic CSI is transmitted in subframe n−4 and subframe n−2 (K>=4, L=0), the UE may use the aperiodic CSI-RS transmitted in subframe n−2 for aperiodic CSI. This may be realized by storing the aperiodic CSI-RS transmitted in subframe n−4 in the buffer provided in the UE and replacing the same with the aperiodic CSI-RS transmitted in subframe n−2.

Alternatively, to obtain better channel measurement performance, the UE may calculate the aperiodic CSI using all the aperiodic CSI-RSs present within the duration specified above. To do this, two aperiodic CSI-RSs may be defined/configured to have the same antenna port configuration (e.g., number of antenna ports, antenna port subset).

In particular, in the case of an aperiodic CSI-RS having two or more different antenna port configurations, the UE may calculate and report a channel measurement result aggregating measurement results for the respective antenna ports. For example, to measure the CSI for a total of 12 antenna ports, a 4-port-aperiodic CSI-RS and an 8-port-aperiodic CSI-RS may be transmitted and the UE may concatenate the measurement results of these two aperiodic CSI-RSs and report the CSI on the 12 antenna ports to the base station.

In addition, in the above example, the UE may calculate the CSI on the 4-port-aperiodic CSI-RS and the CSI on the 8-port-aperiodic CSI-RS independently, and then report both CSIs through one aperiodic CSI, or may select the best of the two CSIs and report a corresponding configuration and the CSI (i.e., best CSI) for the configuration.

In particular, in order to reduce overhead caused by the aperiodic CSI-RSs, the aperiodic CSI-RS to be transmitted to the UE may be transmitted through only some antenna ports (for the number of antenna ports configured through RRC). To this end, the antenna port subset for transmission of the corresponding aperiodic CSI-RS may be signaled to the UE through the aperiodic CSI-RS indication of the aperiodic CSI-RS.

To this end, an antenna port subset that is predefined or defined through higher layer signaling such as RRC signaling is indicated to the UE. For example, when a two-bit indication is used, the antenna port subset may be configured as follows.

Method 1. Aperiodic CSI-RS; Resource-Common Configurations:

A. An antenna port common to all aperiodic CSI-RS resources may be defined. For example, the "number of antenna ports" may be semi-statically set for each aperiodic CSI-RS resource through RRC signaling. The following table illustrates a case where the "number of antenna ports" is set to 8 for the corresponding aperiodic CSI-RS resources in common.

TABLE 15

| Subset Index | Antenna Port Subset |
|---|---|
| 00 | 4-port subset 1 (e.g., antenna ports 15, 16, 17, 18) |
| 01 | 4-port subset 2 (e.g., antenna ports 15, 16, 19, 20) |
| 10 | 8-port subset (e.g., antenna ports 15, 16, 17, 18, 19, 20, 21, 22) |
| 11 | 4-port subset 3 (e.g., antenna ports 17, 18, 21, 22) |

B. Parameters (e.g., the number of antenna ports) of some of the properties of the aperiodic CSI-RS may be resource-specifically defined, and a configuration candidate set according to the parameters may be defined for aperiodic CSI-RS (in the CSI process) in common and be indicated through the DCI.

TABLE 16

| Subset Index | Antenna Port Subset |
|---|---|
| 00 | 2-port subset 1 (e.g., antenna ports 15 and 17) for CSI-RS resources set to 4-port or 4-port subset 1 (e.g., antenna ports 15, 16, 17 and 18) for CSI-RS resources set to 8-port |
| 01 | 2-port subset 2 (e.g., antenna ports 15 and 18) for CSI-RS resources set to 4-port or 4-port subset 2 (e.g., antenna ports 15, 17, 19 and 21) for CSI-RS resources set to 8-port |
| 10 | 2-port subset 3 (e.g., antenna ports 16 and 17) for CSI-RS resources set to 4-port or 8-port subset (e.g., antenna ports 15, 16, 17, 18, 19, 20, 21 and 22) for CSI-RS resources set to 8-port |
| 11 | 4-port subset 1 (e.g., antenna ports 15, 16, 17 and 18) for CSI-RS resources set to 4-port or 4-port subset 3 (e.g., antenna ports 15, 16, 19 and 21) for CSI-RS resources set to 4-port |

Method 2. Aperiodic CSI-RS; Resource-Specific Configuration (According to the Antenna Port Subset)

A. An independent antenna port subset may be configured for each aperiodic CSI-RS resource. This means that, when a configuration table such as Tables 16 and 17 above is dynamically indicated by specific DCI, the corresponding state can be dynamically indicated separately for each resource-specific configuration.

In the example above, the subset index may be used to indicate the corresponding antenna port subset in the DCI.

As another technical proposal, the following options are available regarding the actually transmitted RE pattern of the aperiodic CSI-RS operatively connected with the antenna port subset.

Option 1. The Number of Antenna Ports Set for the Aperiodic CSI-RS and a Partial RE Pattern in the Legacy RE Pattern A. In Option 1, measurement shall be performed only for the (partial) RE pattern corresponding to the antenna port subset indicated to the UE without changing the number of antenna ports set for the corresponding resource. For example, if 8 ports are set for the resource and the antenna port subset is dynamically indicated as {15, 16, 19, 20}, the UE may measure the CSI-RS using only four REs corresponding to a given antenna port subset in the (legacy) CSI-RS RE pattern. REs not used for CSI-RS transmission may be used for other purposes (for example, data transmission).

Option 2. (Legacy, or Predefined/Preconfigured) RE Pattern According to the Number of Antenna Ports Indicated by the Antenna Port (Subset) Configuration A. In Option 2, while the number of CSI-RS REs to be transmitted is determined according to the antenna port numbers included in the antenna port subset, and the RE pattern positions at which the corresponding CSI-RS REs are to be transmitted are fixed (as legacy pattern, or predefined/preconfigured), the antenna port numbering applied to the RE pattern shall conform to the antenna port (subset) configuration. For example, when the base station implements 8-port transmission, this fact may or may not be set for the UE. For example, when the antenna port subset indicates antenna ports {15, 16, 19, 20}, the UE recognizes that the aperiodic CSI-RS is subject to 4-port transmission and measures the aperiodic CSI-RS for the (legacy, or predefined/preconfigured) 4-port RE pattern. If a specific "antenna port subset (hopping/cycling) pattern" is indicated as well at this time, the UE may be defined/configured to derive and report CSI aggregated by concatenating the antenna port numbering with respect to the other ports of the CSI-RS received at different timing points.

To measure the channel for all antenna ports, the base station may configure, for the UE, an aperiodic CSI-RS having different configurations (e.g., antenna port subsets) in two or more (adjacent) subframes. Here, the union of the antenna port subsets may represent all antenna ports, and the UE may calculate and report channel information about all antenna ports by aggregating the channel information measured in each subframe.

In particular, in order to prevent aging of the measured channel information, certain restrictions may be imposed such that aperiodic CSI-RSs using different antenna port subsets can be transmitted in adjacent subframes. For example, in the "timing pattern" information, some of { . . . , Subframe n−2, Subframe n−1, Subframe n, Subframe n+1, . . . } in which aperiodic CSI-RSs are transmitted with respect to subframe n may be implicitly defined/configured, for example, in the form of "multi-shot triggering". To this end, the base station may indicate a plurality of aperiodic CSI-RSs in one DCI. In order to indicate a plurality of aperiodic CSI-RSs in one DCI, information on the position at which each aperiodic CSI-RS is transmitted should be included, and the method described above may be used for the details of the information. For example, the RE pattern may be common to the plurality of aperiodic CSI-RSs or be predefined/preconfigured (for each resource), or may be included in the dynamic indication attribute by the "multi-shot triggering" mentioned above.

In this case, a plurality of antenna port subsets may be operatively connected with the respective aperiodic CSI-RS transmission timing points within a specific duration (which may be defined with the values of K and L disclosed above) (in the form of an "antenna port subset" hopping/cycling pattern). For example, to send an aperiodic CSI-RS for the actual 4 ports (the number of antenna ports may be set to 8

(>4) on the RRC configuration as described above), an aperiodic CSI-RS for the first antenna port subset {15, 16, 19, 20} may be set to be transmitted at the first aperiodic CSI-RS transmission timing point within a specific duration and an aperiodic CSI-RS for the second antenna port subset {17, 18, 21, 22} may be set to be transmitted at the second aperiodic CSI-RS transmission timing point within the specific duration. The antenna port subsets (or hopping/cycling pattern information) according to time is transmitted to the UE through higher layer signaling such as RRC or MAC signaling.

The configurations for the aperiodic CSI-RSs may be predefined or given through higher signaling such as RRC, and may be indicated to the UE using means such as the DCI. That is, when 4-bit DCI signaling is used, 16 configurations may be preset or predefined through RRC, and one of the configurations may be indicated through the DCI signaling. For the configuration for the aperiodic CSI-RS the following information may be included in, for example, the aperiodic CSI-RS related information, and it is apparent that some of the operations proposed above are applicable to at least one of the following pieces of information. In addition, the following attributes may be included in the configuration of a periodic CSI-RS, rather than the aperiodic CSI-RS, which is mainly discussed in the present invention.

A configuration ID (for the aperiodic CSI-RS) (for example, the following attributes may be dynamically indicated separately rather than being configured within the aperiodic CSI-RS resources):
Resource (RE/timing) pattern
Antenna port subset
The number of antenna ports
Subframe-configuration (for example, if a specific subframe-configuration is indicated when a plurality of subframe-configurations is set as targets of the dynamic indication, periodic transmission may be performed with a corresponding periodicity/offset until another subframe-configuration is indicated. Alternatively, the indication may be given by a separate indicator for deactivation)
Scrambling ID (e.g., a virtual cell identifier)
QCL-related information (e.g., CRS information having a QCL relationship with the aperiodic CSI-RS)

That is, at least one of the above attributes may be indicated by one DCI in the form of "multi-shot triggering" while being preset/defined in the above-mentioned hopping/cycling pattern.

If the aperiodic CSI-RS indication and the transmission DCI of the aperiodic CSI request are separated, the aperiodic CSI request field may be utilized for the aperiodic CSI-RS indication. For example, when 2 additional bits are used for the aperiodic CSI-RS indication, if the bits are transmitted in a specific state (e.g., '00'), the 2 bits of the aperiodic CSI request field may be construed as the existing aperiodic CSI request. If the aperiodic CSI-RS indication field is set to a value other than '00', the aperiodic CSI request field may be construed as X (e.g., X=12) specific states (remaining states excluding four '00xx' of the 16 states) in the 4-bit payload along with the aperiodic CSI-RS indication field, and thus the corresponding aperiodic CSI-RS indication information may be transmitted to the UE.

If UL data allocation is not needed for the UE, a field for UL data (e.g., resource allocation (RA)) in the UL DCI may be used to allow aperiodic CSI-RS configuration signaling to be less constrained in transmitting the aperiodic CSI-RS indication through the UL DCI. Specific states (e.g., '1111') of the values of the indication field may be defined in the form of, for example, an 'Extended aperiodic CSI-RS indication'. When the corresponding state is signaled to the UE, fields which are left unused such as the UL resource allocation field may be utilized as additional aperiodic CSI-RS indication fields to transmit more detailed configurations to the UE. In this case, some of the UL DCI fields other than the CQI request field and the SRS request field may be used.

In order to perform aperiodic CSI reporting as described above, the corresponding CSI is piggybacked on the PUSCH and transmitted. In particular, when CSI for two or more CSI-RS resources in one CSI process is measured/reported, the UE maps the CSI for each CSI-RS resource to PUSCH resources, starting with the lowest CSI-RS resource index. Thus, the following procedure is performed.

1. The lowest CSI process index is prioritized.
2. If the CSI process indexes are the same, the lowest CSI-RS resource index is prioritized.

The CSI-RS resource index is an index for a CSI-RS resource configured in a CSI process, and CSI-RS 1 and CSI-RS 2 in FIG. 5 or 6 are examples thereof.

In order to support the above operations using CSI processes, when the two aperiodic CSI-RS resources are allocated to different CSI processes and each CSI process is allocated to a state of the aperiodic CSI request, a two-bit aperiodic CSI request may be used to inform the UE of information about which aperiodic CSI-RS is transmitted. This does not require additional DCI signaling, but the CSI processes may become inefficient because the maximum number of CSI processes to be configured for the UE is limited (e.g., a maximum of five CSI processes).

TABLE 17

| Index | Aperiodic CSI request |
| --- | --- |
| 00 | No aperiodic CSI request |
| 01 | Aperiodic CSI request for CSI process 0 |
| 10 | Aperiodic CSI request for CSI process 1 |
| 11 | Aperiodic CSI request for CSI process 2 |

The table shows an exemplary case where aperiodic CSI-RS resources 1 are allocated to CSI process 1 and aperiodic CSI-RS resources 2 are allocated to CSI process 2. Therefore, when 10 is transmitted to the UE through the aperiodic CSI request, the UE may measure/report aperiodic CSI for the nearest resource among aperiodic CSI-RS resources 1.

Beam-Limited ZP CSI-RS

In order to measure interference in the CoMP environment, CSI-IM has been configured to create an environment where interference measurement is easy to perform while cooperation of adjacent base stations is operating. However, if a CSI process for measuring interference or the like is configured in a situation such as CoMP when a plurality of CSI-RSs can be configured in one CSI process as described above, resources for the CSI-RSs may be insufficient. For example, when five CSI processes are configured and four CSI-RSs are configured per CSI process, a total of 20 CSI-RS resources is used. In a situation like the current LTE standard, up to 10 CSI-RS resources are available when 8 ports are given. Therefore, in configuring CSI-IM sharing CSI-RS resources as in the current environment, CSI-RS resources may be insufficient.

Therefore, a method of limiting a part of the properties of the CSI-RS for a signal transmitted on the corresponding resource may be considered on behalf of CSI-IM. For example, the ZP-CSI-RS may be configured only for a UE using a specific vertical beam. However, when a vertical beam is used, it is difficult to completely eliminate the influence of interference on a specific UE depending on the characteristics of the corresponding beam, and therefore it is difficult to completely eliminate the influence of interference on the UE. In addition, the current CSI-IM cannot recognize whether interference is completely avoided on the corresponding resource or whether only a part of the interference is suppressed by vertical beam avoidance or the like. That is, with the current method, the interference effect given when a specific 'characteristic' is used for data transmission in an interference cell may not be accurately checked.

Therefore, the base station may configure CSI-part-IM (CSI-PIM) for the UE, instead of configuring the CSI-IM. The UE aims to measure the level of interference suppression on the corresponding resource when a neighboring base station limits certain characteristics in data transmission. The UE measures the interference result on the corresponding CSI-PIM resource and feeds back the result to the base station. The base station is expected to share the corresponding information among the base stations and use the same for more efficient vertical beam scheduling. For example, if there are many UEs having large interference with a specific vertical beam in cell A, the base station of cell B may restrict use of the vertical beam for a specific time in consideration of cell A. The existing CSI-IM may measure the interference on the corresponding resource and use the same in CQI calculation. In this case, an operation to be performed by the neighboring base station (for example, no transmission, routine data transmission, etc.) is not explicitly specified on the corresponding resource. That is, the interfering base station may or may not transmit data on the corresponding resource. In this situation, the UE may perform interference measurement to measure an interference close to the interference that will actually be received when data is transmitted.

In the case of CSI-PIM, the ZP-CSI-RS may be applied to a UE to which data transmission with a specific 'characteristic' is performed, on the corresponding resource. For example, when an interference base station performs data transmission using a total of four vertical beams, vertical beam 0 to vertical beam 3, the ZP-CSI-RS may be applied only to resources for a UE using vertical beams 0 and 1. Therefore, on the CSI-PIM resource, the interference cell may or may not transmit data, but there is no data to be transmitted using a specific 'characteristic'. Therefore, the UE can measure only interference incurred when transmission is performed using the specific 'characteristic'.

In this case, the UE may directly report the amount of measured interference to the base station rather than transmitting CQI including interference measured in the CSI-PIM. Alternatively, the UE may inform the base station of whether the interference measured in the CSI-PIM is bearable. For example, if there is an interference threshold that the UE can bear, and the interference measured in the CSI-PIM is greater than the interference threshold, the UE may send a feedback indicating 'unbearable interference'. If the measured interference is less than the interference threshold, the UE may send a feedback indicating 'bearable interference'. In this case, for example, 1-bit signaling may be used to feed back '0' or '1' by defining '0' as 'bearable interference' and '1' as 'unbearable interference', or vice versa. Alternatively, the UE may directly send the absolute amount of the measured interference, and the base station may determine whether the interference is "bearable interference" in consideration of a UE interference threshold transmitted from the UE to the base station in advance, and may share the determination among the base stations. The UE may keep the interference threshold as a capability of the UE, may transmit the same to the base station when necessary, or may receive a interference threshold set and transmitted by the base station through higher layer signaling or the like.

Considering the delay between base stations, fast fading characteristics of interference are meaningless in measurement. Accordingly, long-term characteristics of interference may be measured by performing CSI-PIM for a certain period. In this case, the CSI-PIM configuration may include the start subframe/end subframe (or duration) of a resource in addition to the resource characteristics of the CSI-RS. The CSI-PIM is configured from the start subframe to the end subframe (or for the duration), and the UE measures the interference amount on the configured CSI-PIM resource during the corresponding duration.

With this method, the interference applied to the UE when the interference base station uses a specific beam may be accurately measured. In addition, if the transmission delay between base stations is small, this information may be quickly used for cooperative communication between the CoMP base stations. However, if the transmission delay between the base stations is large, a large delay gain may not be obtained compared with the following RRM measurement method.

Feedback on whether or not the interference is bearable may be sent through higher layer signaling. Alternatively, it may be used together with an aperiodic CSI request. If the aperiodic CSI request requests feedback in the aperiodically configured CSI-PIM, the UE may measure/determine whether the interference intensity measured in the corresponding CSI-PIM or the interference is bearable, and feedback the result through a UL resource.

The operation may be replaced by RRM measurement. The UE may compare the value of a measurement result with an interference threshold for a measured RRM-RS. Then, the UE may feed back whether the interference is bearable for the RRM-RS. Alternatively, the UE may transmit the interference threshold of the UE to the base station and the base station may determine whether the interference is bearable for the CSI-RS based on the RRM report value received from the UE. Alternatively, the base station may simply share the received RRM report value among the base stations. In this case, there is no need to allocate an additional CSI-RS, and therefore the overhead of the physical layer may be reduced, compared to the overhead in the conventional method. However, the time required for RRM measurement and communication using the upper layer is long, and accordingly a longer delay may be given than when the CSI-PIM is used.

LTE Rel-13 FD-MIMO supports beamformed CSI-RS-based operations, and the beamformed CSI-RS is divided into two main features. Regarding the number K of NZP CSI-RS resources configured in the CSI process of Class B, Class B with K>1: CRI reporting including existing RI/PMI/CQI reports Class B with K=1: depends on PMI-configuration that instructs use of existing RI/PMI/CQI reports, legacy codebook or new codebook defined in Rel-13.

Class B with K>1 is generally considered to be based on cell-specific beamformed CSI-RSs transmitted in a cell with different beamforming coefficients applied per CSI-RS, and thus the UE may select and report the index of the CSI-RS among K CSI-RSs configured by the CRI report. However, it is not necessary to always include the cell-specific beamformed CSI-RS. Depending on implementation of the base station, UE-specific (or UE group-specific) beamformed CSI-RS resources for beam selection by the UE at the CSI-RS resource level may be given.

Class B with K=1 may be based on a UE-specific beamformed CSI-RS transmitted for the UE in general, and thus the UE may send a CSI report based on the configured "UE-dedicated" beamformed CSI-RS resource. Depending on implementation of the base station, this case may be used based on a UE group-specific beamformed CSI-RS to reduce CSI-RS overhead, particularly when the common beam direction is applicable to a K=1 beamformed CSI-RS resource common to a plurality of UEs in a cell.

Of the features supported above for class B, potential improvement topics related to beamformed CSI-RS-based operations are described below.

CRI Subset Restriction for Mitigating Inter-Cell Interference

Figure 10:
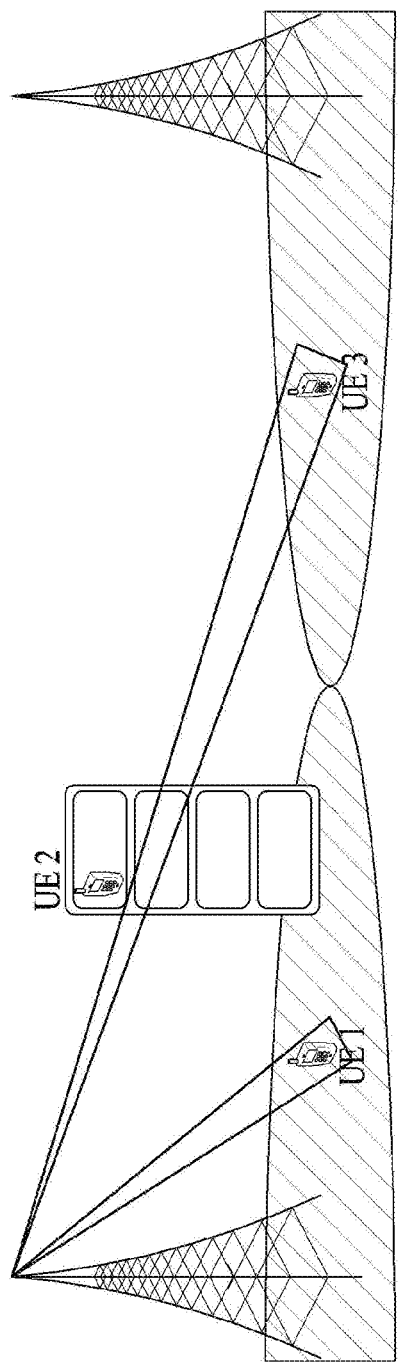
FIG. 10 illustrates transmission using a vertical beam according to an embodiment of the present invention.

For Class B with K>1, the K configured CSI-RSs are transmitted in different beam directions, which may include different vertical beam directions, as shown in FIG. 10. However, if a beam can reach the UEs of other cells, specific beams may cause strong interference to neighboring cells. For example, a beam for UE 2 may directly interfere with UE 3 of a neighboring cell, and such beam may be directed in a horizontal direction, which causes severe inter-cell interference.

In order to avoid this interference problem, strict beam restrictions may be considered regarding vertical beam steering. For example, the beam directed to the UE 2 may be strictly prohibited. However, if there is no UE interfering with a UE in a high-rise building, or if some scheduling coordination between neighboring cells is possible according to network implementation, the service can be provided through the beam for data transmission, and therefore simply restricting beams is not preferable in any case.

In LTE Rel-13, CRI reporting and related CSI feedback actions, which are supported for two subframe sets, may be considered in order to support network flexibility for controlling assumptions of the UE on which the CRI subset restrictions per subframe set mitigate the problem and derive the CRI. For example, K beamformed CSI-RSs with all beam directions may be configured for subframe set 1, while only a subset of K CSI-RSs may be limited so as to be valid for subframe set 2. The UE may then measure and report CSI including the CRI for each subframe set, and thus the base station may flexibly use the CRI considering an inter-cell interference condition and possible adjustment between cells.

CRI subset restrictions with a subframe set are considered in order to mitigate inter-cell interference.

Reduction of Overhead Including CSI-RS Activation/Deactivation

Figure 11:
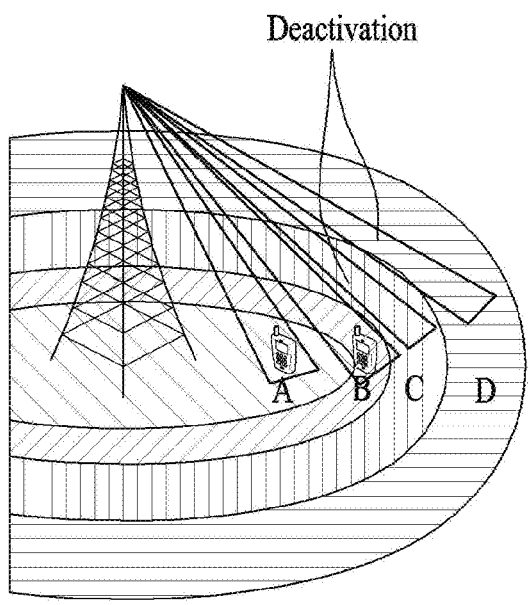
FIG. 11 illustrates transmission using a vertical beam according to an embodiment of the present invention.

CSI-RS overhead reduction techniques need to be investigated according to their purposes. One approach to reducing overhead should be related to dealing with activation/deactivation of the beamformed CSI-RS in each cell, depending on UE distribution in the cell. More specifically, the base station needs to be supported so as to turn on or off some CSI-RSs oriented in a specific direction depending on whether there is a UE to be served in specific beam directions. As shown in FIG. 11, there may be certain CSI-RSs for which no UE is selected during the time duration of CRI reporting, like CSI-RSs directed to zones C and D. These CSI-RSs may be deactivated through appropriate L2 signaling somewhat similar to activating/deactivating the SCell in a carrier aggregation (CA) system and may be more appropriate than relying on RRC reconfiguration in terms of fast and efficient resource utilization.

The resources for deactivated CSI-RSs may be utilized for data transmission, and thus the CSI-RS overhead reduction mechanism has the benefit of increasing resource utilization efficiency. As a result, similar L1/L2-level signaling for ZP CSI-RS reconfiguration considering updating some activated/deactivated CSI-RS REs also needs to be supported on behalf of other UEs not set to Class B, K>1.

Overhead reduction mechanism based on CSI-RS activation/deactivation should be investigated.

The above method is a technique for saving resources for transmission of the corresponding CSI-RS by activating/deactivating some beams of the corresponding CSI-RSs in the FD-MIMO scheme for transmitting a plurality of CSI-RSs for CRI measurement and reporting. To this end, it is necessary to deactivate the ZP CSI-RS for the non-active CSI-RS resource. In conventional cases, a class A UE that does not report CRI or a UE that does not use FD-MIMO supports deactivation informing the UE of the ZP CSI-RS configuration for the resource in order to avoid rate-matching.

If the CSI-RS for a specific resource can be activated/deactivated as described above, the resource may be configured for the UEs so as not to be rate-matched anymore by deactivating the ZP CSI-RS corresponding to the resource. To do this, signaling with little delay, such as DCI or MAC, is used. In particular, the corresponding configuration may be cell-specifically transmitted. When DCI is used for this purpose, a format such as DCI 3/3A may be used.

The ZP CSI-RS deactivation (or activation) signal may be configured as follows.

Option 1. Start time+Target ZP CSI-RS resource

For the start time, an absolute time value may be used, or an offset value with respect to the time when the signaling is received may be used.

The duration or the end time may be given as higher layer signaling, such as RRC signaling, or may be a fixed value.

Option 2. Start point+Duration+Target ZP CSI-RS resource

Option 3. Start point+End point+Target ZP CSI-RS resource

Option 4. Start point+Target ZP CSI-RS resource and Separate ZP CSI-RS activation signal Separate activation signaling is sent. Therefore, the non-active state of the ZP CSI-RS lasts until activation.

For the activation time, an absolute time value may be signaled, or an offset value with respect to the time when the corresponding signaling is received may be signaled.

Option 5. Start point+Target ZP CSI-RS resource, and separate ZP CSI-RS activation signal+Target ZP CSI-RS resource In the above scheme, the ZP CSI-RS may be selectively activated in the activation signaling.

The target resource may be transmitted in a bitmap form. In this case, the resource transmitted in the bitmap may be a conventional 4-port ZP CSI-RS resource indication or a resource indicator for a separate K-port (K may be a number other than 4) ZP CSI-RS resource configured through RRC signaling.

The ZP CSI-RS deactivation (and/or activation) signal may be construed as a ZP CSI-RS update signal. That is, the corresponding ZP CSI-RS may be deactivated (or activated) for the designated ZP CSI-RS resource regardless of the deactivation/activation signal. In other words, when four resources are deactivated with the ZP CSI-RS bitmap '1111', '1101' included in the next ZP CSI-RS update signal may be construed as activating the third ZP CSI-RS resource.

In the above option, the start time may be given through higher layer signaling such as RRC, or may be a fixed value (e.g., Subframe for receiving the indication+k subframes, k=0, 1, or 8 . . . ). In this case, the above option may not include the start point. For example, in case of Option 1, only the target ZP CSI-RS designation signal may be included.

Without separate signaling, NZP CSI-RS deactivation signaling may be construed as ZP CSI-RS deactivation signaling. Alternatively, some of the fields of the NZP CSI-RS deactivation signaling (e.g., the target NZP CSI-RS resource indication field) may be construed as signaling (e.g., the target ZP CSI-RS resource indication field) included in the ZP CSI-RS deactivation signaling. In this case, the NZP CSI-RS must be cell-specific signaling.

The ZP CSI-RS activation/deactivation described above may be similarly applied to a signal for NZP CSI-RS activation/deactivation. The NZP CSI-RS deactivation signal (and/or activation signal) may be configured as follows.

Option 1. Start point+Target NZP CSI-RS
Option 2. Start point+Duration+Target NZP CSI-RS
Option 3. Start point+End point+Target NZP CSI-RS
Option 4. Start point+Target NZP CSI-RS, and Separate NZP CSI-RS activation signal
Option 5. Start point+Target NZP CSI-RS, and Separate NZP CSI-RS activation Here, the target NZP CSI-RS may be transmitted in a bitmap form. In this case, the resource configured and transmitted as a bitmap may correspond to an NZP CSI-RS configured through RRC signaling or the like, and the NZP CSI-RSs corresponding to the respective bits in the bitmap may be mapped in order of resource configurations assigned thereto in the same CSI process.

Reduction of Overhead of Aperiodic CSI-RS

Figure 12:
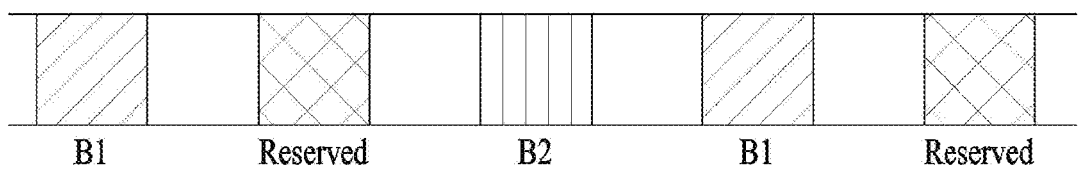
FIG. 12 illustrates a CSI-RS to which different beams are applied according to an embodiment of the present invention.

To reduce CSI-RS overhead, a measuring restriction (MR) specified in LTE Rel-13 may be used as aperiodic CSI-RS transmission within preconfigured possible CSI-RS transmission instances. For a CSI-RS set to 'MR-ON', the UE may measure the CSI-RS only when an aperiodic CSI request is received. As shown in FIG. 12, for example, different beams of indexes B1 and B2 may be applied to the same CSI-RS, which may be referred to as "CSI-RS resource pooling". In other words, the base station may freely select and transmit beamformed CSI-RSs with different beam directions applied within predetermined preconfigured transmission instances. However, this existing mechanism has a significant limitation in improving resource utilization efficiency of CSI-RS transmission, since it requires a reserved resource, e.g., a 5 ms grid. This is because occupied resources unrelated to actual CSI-RS transmissions cannot be used for other purposes such as data transmission. If the reserved transmission instances of possible CSI-RS transmissions are often not actually used, the problem of such inefficient resource utilization becomes more serious.

Therefore, for more flexible resource utilization, dynamic indication of an aperiodic CSI-RS may be considered. An aperiodic CSI-RS indication message, which may be associated with an aperiodic CSI request, is sent to the UEs by which the aperiodically transmitted CSI-RSs will be used for CSI measurements. In other words, resources may be utilized for the aperiodic CSI-RS, and alternatively, resources without this aperiodic indication may be used for other purposes such as data transmission, leading to a significant reduction in CSI-RS overhead. For UEs not instructed to report aperiodic CSI, this aperiodic CSI-RS indication message may be construed as a dynamic ZP-CSI-RS indication for UEs to perform PDSCH rate matching around the indicated resources. This mechanism does not require a specific preconfigured time grid, such as a 5 ms grid at possible CSI-RS transmission instances, which gives flexibility in resource utilization for base station implementation.

Dynamic indication of aperiodic CSI-RS transmission should be supported for efficient resource utilization.

In the above case, a UE which does not need to measure an aperiodic CSI-RS may be informed of transmission of the aperiodic CSI-RS through signaling of DCI (e.g., a 1-bit ZP-CSI-RS indicator), and a separate ZP-CSI-RS configuration (assuming aperiodic CSI-RS transmission) configured for the UE through RRC or the like may be selected to cause the UE to perform rate matching. In particular, this operation may be limitedly applied only to a specific TM. For example, a new indicator such as the 1-bit indicator may be configured only for TM9. In the case of TM10, a ZP-CSI-RS, which assumes a time when the aperiodic CSI-RS is transmitted, may be configured through RRC without a separate ZP-CSI-RS configuration, and then may be used through PQI.

In addition, the aperiodic CSI-RS indicator may be used as a resource selector. In this case, the aperiodic CSI-RS indicator may report, to the base station, CSI on the resource or the resource set designated by the indicator CSI among the CSI-RS resources included in the corresponding CSI process (for example, a specific CSI process dynamically indicated through an aperiodic CSI request field that comes together at the same time point (e.g., SF)). The UE may report the CSI on the best CSI-RS including the CRI (this case may be considered as extension/restriction of CSI-RS resources subject to CRI measurement/reporting), or report the entire CSI on the CSI-RS designated as the resource indicator rather than selecting and reporting the best CRI. The CSI-RS resource set may be configured through higher layer signaling such as RRC signaling.

Figure 13:
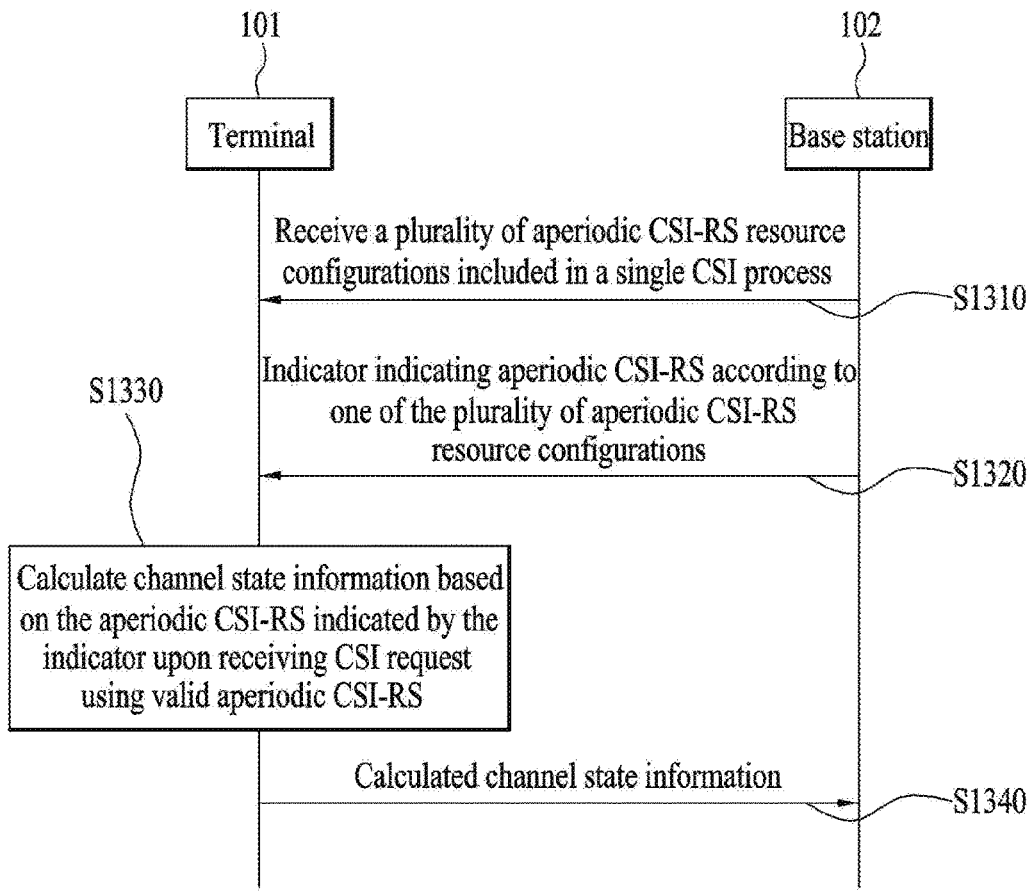
FIG. 13 illustrates operation according to an embodiment of the present invention.

FIG. 13 illustrates operation according to an embodiment of the present invention.

FIG. 13 illustrates a method for channel state reporting using an aperiodic channel state information-reference signal (CSI-RS) in a wireless communication system.

A UE 101 may receive a plurality of aperiodic CSI-RS resource configurations included in a single CSI process (S1310). Then, the UE may receive an indicator indicating an aperiodic CSI-RS according to one of the plurality of aperiodic CSI-RS resource configurations (S1320). Upon receiving a CSI request using a valid aperiodic CSI-RS, the UE may calculate the CSI based on an aperiodic CSI-RS indicated by the indicator (S1330), and transmit the calculated CSI to a base station 102 (S1340).

The indicator may further indicate antenna port information common to the plurality of aperiodic CSI-RS resource configurations.

The indicator may further indicate antenna port information for the aperiodic CSI-RS indicated by the indicator.

In addition, the UE may calculate CSI based on the aperiodic CSI-RS on a resource element corresponding to the antenna port information for the aperiodic CSI-RS.

In addition, the UE may receive control information indicating transmission of aperiodic CSI-RSs transmitted on partial antenna ports in a plurality of adjacent subframes.

The control information may include partial antenna port information used for aperiodic CSI-RS transmission in each subframe.

The UE may measure aperiodic CSI-RS according to each partial antenna port information in the plurality of adjacent subframes and combine the measurement results in the plurality of adjacent subframes to calculate channel information on all antenna ports.

In addition, the indicator may indicate one of the plurality of aperiodic CSI-RS resource configurations in combination with a channel state report request using the aperiodic CSI-RS.

If the channel state report request is received within K subframes from the time the indicator is received, it may be determined that the received channel state report request is valid. In addition, if the UE does not receive the channel state report request using the valid aperiodic CSI-RS, the UE may calculate CSI on a CSI-RS configured as the target of the aperiodic CSI in the single CSI process and report the CSI to the base station.

Although embodiments according to the present invention have been briefly described with reference to FIG. 13, embodiments related to FIG. 13 may alternatively or additionally include at least a part of the above-described embodiment(s).

Figure 14:
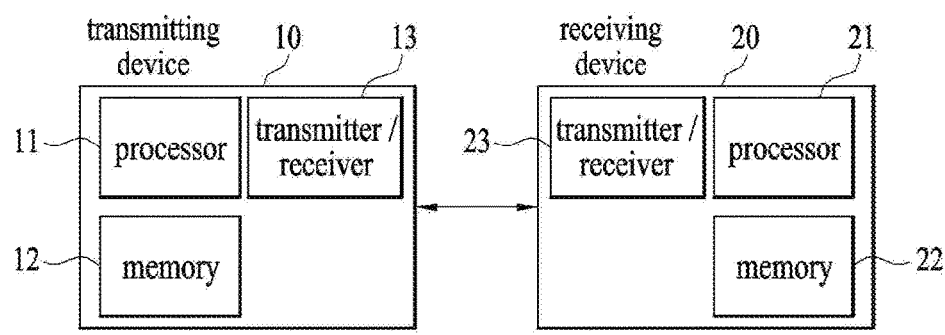
FIG. 14 is a block diagram illustrating devices for implementing embodiment(s) of the present invention.

FIG. 14 is a block diagram of a transmitting device 10 and a receiving device 20 configured to implement exemplary embodiments of the present invention. Referring to FIG. 14, the transmitting device 10 and the receiving device 20 respectively include radio frequency (RF) units 13 and 23 for transmitting and receiving radio signals carrying information, data, signals, and/or messages, memories 12 and 22 for storing information related to communication in a wireless communication system, and processors 11 and 21 connected operationally to the RF units 13 and 23 and the memories 12 and 22 and configured to control the memories 12 and 22 and/or the RF units 13 and 23 so as to perform at least one of the above-described embodiments of the present invention.

The memories 12 and 22 may store programs for processing and control of the processors 11 and 21 and may temporarily storing input/output information. The memories 12 and 22 may be used as buffers. The processors 11 and 21 control the overall operation of various modules in the transmitting device 10 or the receiving device 20. The processors 11 and 21 may perform various control functions to implement the present invention. The processors 11 and 21 may be controllers, microcontrollers, microprocessors, or microcomputers. The processors 11 and 21 may be implemented by hardware, firmware, software, or a combination thereof. In a hardware configuration, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) may be included in the processors 11 and 21. If the present invention is implemented using firmware or software, firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 is scheduled from the processor 11 or a scheduler connected to the processor 11 and codes and modulates signals and/or data to be transmitted to the outside. The coded and modulated signals and/or data are transmitted to the RF unit 13. For example, the processor 11 converts a data stream to be transmitted into K layers through demultiplexing, channel coding, scrambling and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include Nt (where Nt is a positive integer) transmit antennas.

A signal processing process of the receiving device 20 is the reverse of the signal processing process of the transmitting device 10. Under the control of the processor 21, the RF unit 23 of the receiving device 10 receives RF signals transmitted by the transmitting device 10. The RF unit 23 may include Nr receive antennas and frequency down-converts each signal received through receive antennas into a baseband signal. The RF unit 23 may include an oscillator for frequency down-conversion. The processor 21 decodes and demodulates the radio signals received through the receive antennas and restores data that the transmitting device 10 wishes to transmit.

The RF units 13 and 23 include one or more antennas. An antenna performs a function of transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. A signal transmitted through each antenna cannot be decomposed by the receiving device 20. A reference signal (RS) transmitted through an antenna defines the corresponding antenna viewed from the receiving device 20 and enables the receiving device 20 to perform channel estimation for the antenna, irrespective of whether a channel is a single RF channel from one physical antenna or a composite channel from a plurality of physical antenna elements including the antenna. That is, an antenna is defined such that a channel transmitting a symbol on the antenna may be derived from the channel transmitting another symbol on the same antenna. An RF unit supporting a MIMO function of transmitting and receiving data using a plurality of antennas may be connected to two or more antennas.

In embodiments of the present invention, a UE serves as the transmission device 10 on uplink and as the receiving device 20 on downlink. In embodiments of the present invention, an eNB serves as the receiving device 20 on uplink and as the transmission device 10 on downlink.

The transmitting device and/or the receiving device may be configured as a combination of one or more embodiments of the present invention.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

INDUSTRIAL APPLICABILITY

The present invention may be used for a wireless communication apparatus such as a terminal, a relay and a base station (BS).

What is claimed is:

1. A method for channel state reporting using an aperiodic channel state information-reference signal (CSI-RS) in a wireless communication system, the method being performed by a terminal and comprising:
    receiving configuration information on a plurality of CSI-RS resources configured with an aperiodic type;
    receiving an aperiodic CSI request indicating one of the plurality CSI-RS resources configured with the aperiodic type;
    reporting aperiodic CSI based on the one of the plurality of CSI-RS resources indicated by the aperiodic CSI request; and
    receiving the one of the plurality of CSI-RS resource after a configured length of time from when the aperiodic CSI request is received,
    wherein the aperiodic CSI request is received as downlink control information (DCI) and includes state information indicating one of the plurality of CSI-RS resources, and
    wherein the configured length of time of configured through Radio Resource Control (RRC) signaling, and the aperiodic CSI request does not include information on the configured length of time.

2. The method according to claim 1, comprising:
    receiving control information indicating transmission of aperiodic CSI-RSs transmitted on a part of antenna ports in a plurality of adjacent subframes,
    wherein the control information comprises information on the part of the antenna ports used for transmission of the aperiodic CSI-RSs in each of the subframes.

3. The method according to claim 2, comprising:
    measuring aperiodic CSI-RSs according to the information on each of the part of the antenna ports in the plurality of adjacent subframes; and
    combining results of the measurement in the plurality of adjacent subframes and calculating channel information for an entirety of the antenna ports.

4. The method according to claim 1, wherein a resource for the CSI-RS resource configured with the aperiodic type indicated by the aperiodic CSI request is available for data transmission.

5. A terminal configured to perform channel state reporting using an aperiodic channel state information-reference signal (CSI-RS) in a wireless communication system, the terminal comprising:
    a transmitter;
    a receiver; and
    a processor that controls the transmitter and the receiver, wherein the processor:
        receives configuration information on a plurality of aperiodic CSI-RS resources configured with an aperiodic type;
        receives an aperiodic CSI request indicating one of the plurality of CSI-RS resources configured with the aperiodic type;
        reports aperiodic CSI based on the one of the plurality of CSI-RS resource configured with the aperiodic type indicated by the aperiodic CSI request, and
        receives the one of the plurality of CSI-RS resource after a configured length of time from when the aperiodic CSI request is received,
        wherein the aperiodic CSI request is received as downlink control information (DCI) and includes state information indicating one of the plurality of CSI-RS resources, and
        wherein the configured length of time of configured through Radio Resource Control (RRC) signaling, and the aperiodic CSI request does not include information on the configured length of time.

6. The terminal according to claim 5,
    wherein the processor is configured to receive control information indicating transmission of aperiodic CSI-RSs transmitted on a part of antenna ports in a plurality of adjacent subframes, and
    wherein the control information comprises information on the part of the antenna ports used for transmission of the aperiodic CSI-RSs in each of the subframes.

7. The terminal according to claim 6, wherein the processor is configured to:
    measure aperiodic CSI-RSs according to the information on each of the part of the antenna ports in the plurality of adjacent subframes; and
    combine results of the measurement in the plurality of adjacent subframes and calculating channel information for an entirety of the antenna ports.

8. The terminal according to claim 5, wherein a resource for the CSI-RS resource configured with the aperiodic type indicated by the aperiodic CSI request is available for data transmission.

* * * * *

UNITED STATES PATENT AND TRADEMARK OFFICE
CERTIFICATE OF CORRECTION

PATENT NO. : 10,587,377 B2  
APPLICATION NO. : 15/579579  
DATED : March 10, 2020  
INVENTOR(S) : Kunil Yum et al.

It is certified that error appears in the above-identified patent and that said Letters Patent is hereby corrected as shown below:

In the Claims

In Column 43, Line 6 Claim 1:
Delete "receiving configuration information on a plurality of" and insert --receiving configuration information for a plurality of--

In Column 43, Line 9 Claim 1:
Delete "plurality CSI-RS resources configured with the" and insert --plurality of CSI-RS resources configured with the--

In Column 43, Line 14 Claim 1:
Delete "receiving the one of the plurality of CSI-RS resource after" and insert --receiving the one of the plurality of CSI-RS resources after--

In Column 43, Line 21 Claim 1:
Delete "wherein the configured length of time of configured" and insert --wherein the configured length of time is configured--

In Column 44, Line 5 Claim 5:
Delete "receiving configuration information on a plurality of" and insert --receiving configuration information for a plurality of--

In Column 44, Line 14 Claim 5:
Delete "receives the one of the plurality of CSI-RS resource" and insert --receives the one of the plurality of CSI-RS resources--

In Column 44, Line 21 Claim 5:
Delete "wherein the configured length of time of configured" and insert --wherein the configured length of time is configured--

Signed and Sealed this  
Seventh Day of July, 2020

Andrei Iancu  
*Director of the United States Patent and Trademark Office*